(12) United States Patent
Sawaragi et al.

(10) Patent No.: US 8,154,226 B2
(45) Date of Patent: Apr. 10, 2012

(54) OPERATING APPARATUS

(75) Inventors: Hiroshi Sawaragi, Chiryu (JP); Keisuke Nagiri, Kariya (JP); Takayoshi Kawai, Okazaki (JP); Nobuyuki Matsui, Kasugai (JP); Makoto Iwasaki, Kasugai (JP)

(73) Assignees: Fuji Machine Mfg. Co., Ltd., Chiryu (JP); National University Corporation Nagoya Institute of Technology, Nagoya (JP)

( * ) Notice: Subject to any disclaimer, the term of this patent is extended or adjusted under 35 U.S.C. 154(b) by 462 days.

(21) Appl. No.: 12/379,939

(22) Filed: Mar. 4, 2009

(65) Prior Publication Data
US 2009/0224717 A1    Sep. 10, 2009

(30) Foreign Application Priority Data

Mar. 7, 2008    (JP) ................................ 2008-057635

(51) Int. Cl.
*H02P 1/00* (2006.01)
(52) U.S. Cl. ........................................ 318/135; 318/687
(58) Field of Classification Search .................. 318/135, 318/687, 560, 9, 14, 632, 638, 283, 286, 318/466

See application file for complete search history.

(56) References Cited

U.S. PATENT DOCUMENTS

| 5,541,833 | A | * | 7/1996 | Bristol et al. | .................. 700/45 |
| 5,736,824 | A | * | 4/1998 | Sato et al. | ..................... 318/561 |
| 5,786,678 | A | * | 7/1998 | Kobayashi et al. | ........... 318/677 |
| 6,037,736 | A | * | 3/2000 | Tsuruta et al. | ................ 318/609 |

FOREIGN PATENT DOCUMENTS

| JP | A-05-250041 | 9/1993 |
| JP | A-5-250041 | 9/1993 |
| JP | A-06-151272 | 5/1994 |
| JP | A-08-249067 | 9/1996 |
| JP | A-2004-240609 | 8/2004 |
| JP | A-2005-071034 | 3/2005 |

OTHER PUBLICATIONS

Office Action mailed Feb. 21, 2012 in counterpart Japanese Patent Application No. 2008-057635 (with English translation).

* cited by examiner

*Primary Examiner* — Rina Duda
(74) *Attorney, Agent, or Firm* — Oliff & Berridge, PLC

(57) ABSTRACT

An operating apparatus including a main body, a movable member, a drive unit having a drive source, and a control unit controlling the drive source to control the position of the movable member relative to the main body. The control unit including a position control system and an acceleration control system. The position control system including a position command portion, a first feedforward compensator outputting a first operation command to the drive source, a second feedforward compensator, a positional-information acquiring device obtaining information related to the position of the movable member, and a first feedback compensator outputting a second operation command to the drive source. The acceleration control system including an acceleration-information acquiring device obtaining information related to an acceleration of the main body, a third feedforward compensator, a second feedback compensator outputting a third operation command to the drive source.

11 Claims, 28 Drawing Sheets

OPERATING APPARATUS

CROSS REFERENCE TO RELATED APPLICATION

The present application claims priority from Japanese Patent Application No. 2008-057635, which was filed on Mar. 7, 2008, the disclosure of which is herein incorporated by reference in its entirety.

BACKGROUND OF THE INVENTION

1. Field of the Invention

The present invention relates to an operating apparatus including a main body, a movable member held such that the movable member is movable relative to the main body, and a drive unit that moves the movable member relative to the main body. In particular, the invention relates to a technique for enabling to position the movable member at high speed and reduce vibration of the main body at the same time.

2. Description of Related Art

For the operating apparatus of this kind, there have been proposed techniques enabling high-speed positioning of a movable member as well as reducing vibration of a main body, as disclosed in JP-A-5-250041, JP-A-6-151272, and JPA-2004-240609, for instance. JP-A-5-250041 and JP-A-6-151272 disclose a technique to detect by an acceleration detector an acceleration of the main body due to a vibration of the main body, and feed the detected acceleration back to an operation command to a drive source of a drive unit, so as to achieve high-speed positioning of the movable member and reduction in vibration of the main body at the same time. JP-A-2004-240609 discloses a technique to use a genetic algorithm to automatically design position command parameters, or alternatively both position command parameters and compensator parameters, which are to be passed to the control object whose main body vibrates, whereby a time taken to design the parameters is reduced. That is, a positioning control system for a control object includes a main body that vibrates and a positioning device that is driven by an electric motor and installed on the main body, and the positioning control system is constructed using positional information that is information on a rotational position of the electric motor, or on the position of a movable member of the positioning device. When the positioning control system is constructed in such a way, position command parameters, or both position command parameters and compensator parameters, are self-adaptively designed or determined using a genetic algorithm so that specifications of the positioning are satisfied while taking account of goals or targets of the control in regard of reduction of the main body vibration as well as operational safety, with respect to a specific travel distance or distances of the movable member.

However, in some cases the control systems described above cannot sufficiently achieve both the high-speed positioning of the movable member and the reduction of vibration of the movable member, and improvement thereon were requested.

SUMMARY OF THE INVENTION

This invention has been developed in view of the above-described situations, and it is an object of the invention, therefore, to improve the control systems.

To attain the object, the invention provides an operating apparatus including a main body, a movable member which is movable relative to the main body, a drive unit which includes a drive source and moves the movable member relative to the main body, and a control unit which controls the drive source so as to control the position of the movable member relative to the main body. The control unit includes (A) a position control system including (a) a position command portion which outputs a first position command designating the position of the movable member, (b) a first feedforward compensator which receives the position command from the position command portion and outputs a first operation command to the drive source, (c) a second feedforward compensator which receives the position command from the position command portion and outputs a second position command, (d) a positional-information acquiring device which obtains information related to the position of the movable member, and (e) a first feedback compensator which receives as an input a difference between the second position command outputted from the second feedforward compensator and an output of the positional-information acquiring device, and outputs a second operation command to the drive source, and (B) an acceleration control system including (f) an acceleration-information acquiring device which obtains information related to an acceleration of the main body, (g) a third feedforward compensator which receives as an input the first position command from the position command portion and outputs an acceleration command, and (h) a second feedback compensator which receives as an input a difference between the first position command outputted from the third feedforward compensator and an output of the acceleration-information acquiring device, and outputs a third operation command to the drive source.

OPERATION AND EFFECTS OF THE INVENTION

In the operating apparatus, there are cases where a control quantity (especially that of an object whose vibration is to be damped or reduced) is not fed back, or feedback information constitutes only a part of a control quantity. In a case where it is impossible to measure or observe a control quantity, it was conventionally practiced to tune or adjust a feedforward compensator or a position command so as to satisfy the required specifications. However, in this case a feedback control is not at all applied to the unobservable control quantity, which is a limitation of such a countermeasure.

On the other hand, according to the control unit of the present operating apparatus, the information related to the acceleration of the main body that is obtained by the acceleration-information acquiring device is not directly or without processing fed back to the operation command to the drive source, but the difference between this information and the acceleration command, which is the output of the third feedforward compensator which receives the position command from the position command portion, is fed back to the operation command to the drive source, in order to actively damp the vibration of the main body.

Thus, it is enabled to achieve high-speed positioning of the movable member while reducing vibration of the main body.

MODES OF THE INVENTION

There will be described by way of examples modes of inventions recognized to be claimable by the present applicant. The inventions may be hereinafter referred to as "claimable inventions", and include at least the invention as defined in the appended claims, which may be referred to as "the invention" or "the invention of the present application". However, the inventions may further include an invention of a concept subordinate or superordinate to the concept of the invention of the present application, and/or an invention of a concept different from the concept of the invention of the present application. The modes are numbered like the appended claims and depend from another mode or modes, where appropriate, for easy understanding of the claimable inventions. It is to be understood that combinations of features of the claimable inventions are not limited to those of the following modes. That is, the claimable inventions are to be construed by taking account of the description following each mode, the description of the embodiments, the related art, and others, and as long as the claimable inventions are constructed in this way, any one of the following modes may be implemented with one or more features added, or one or more of a plurality of features included in any one of the following modes are not necessarily provided all together.

(1) An operating apparatus including: a main body;

a movable member which is movable relative to the main body;

a drive unit which includes a drive source and moves the movable member relative to the main body; and a control unit which controls the drive source so as to control the position of the movable member relative to the main body, the control unit including:

a position control system including (a) a position command portion which outputs a first position command designating the position of the movable member, (b) a first feedforward compensator which receives the position command from the position command portion and outputs a first operation command to the drive source, (c) a second feedforward compensator which receives the position command from the position command portion and outputs a second position command, (d) a positional-information acquiring device which obtains information related to the position of the movable member, and (e) a first feedback compensator which receives as an input a difference between the second position command outputted from the second feedforward compensator and an output of the positional-information acquiring device, and outputs a second operation command to the drive source; and an acceleration control system including (f) an acceleration-information acquiring device which obtains information related to an acceleration of the main body, (g) a third feedforward compensator which receives as an input the first position command from the position command portion and outputs an acceleration command, and (h) a second feedback compensator which receives as an input a difference between the first position command outputted from the third feedforward compensator and an output of the acceleration-information acquiring device, and outputs a third operation command to the drive source.

(2) The operating apparatus according to the mode (1), wherein both of the first feedback compensator and the second feedback compensator are variable compensators.

As described above, according to the control unit of the mode (1), the two control objectives, namely, high-speed positioning of the movable member and reduction of vibration of the main body, are more excellently achieved as compared to the related art, but there is a room for more improvement. Since influence of non-linear friction which is a major component of the disturbance is great at low frequencies, it is desirable to design a control system with lowering the sensitivity at lower frequencies being emphasized, in order to enhance the positioning response behavior. On the other hand, as to the reduction of vibration of the main body, it is desirable to design a control system with lowering the sensitivity at a frequency of a vibration of the main body being emphasized. However, as long as a stability margin is ensured to a degree, it is impossible to obtain a desired sensitivity across the entire frequency spectrum from Bode's sensitivity integral theorem, and it is inevitable that at a part of the frequency spectrum the obtained sensitivity is deviated from the desired value. Hence, it is difficult to achieve at the same time the two control objectives, i.e., high-speed positioning of the movable member and reduction of vibration of the main body at a high level.

Therefore, according to the mode (2), the first feedback compensator and the second feedback compensator are made variable with movement of the movable member. For instance, both the feedback compensators of the position control system and the acceleration control system are made variable, that is, their parameters vary as the movable member moves. In a positioning response process, at a first period before the movable member reaches the vicinity of the target position a control system that is designed with the positioning response behavior being weighted or emphasized performs positioning of the movable member, and at a second period following the first period at which the movable member is in the vicinity of the target position, the control system is smoothly or gradually switched to another control system for another control objective, i.e., a control system designed with the capability of damping or reducing the vibration of the main body being weighted or emphasized. By this, the merits or strong points of the two control systems are taken in a time-varying manner, whereby improving the performance of the positioning response system as a whole.

It is already known to employ a time-varying control system whose control characteristics vary with time, in order to obtain excellent control of an object in a case where characteristics of the control object vary with time. However, it has not been known to make a control system variable in order to achieve a plurality of control objectives, such as high-speed positioning and vibration reduction as the mode (2).

It is noted that the variable control system of the mode (2) is not limited to a time-varying control system whose control characteristics vary with time, but includes a control system whose control characteristics vary with a change in a speed or an acceleration (including a deceleration) of a movement of the movable member, a distance to the target position, or others.

As described above, according to the operating apparatus of the mode (2), basic target-value follow-up characteristics are determined by a feedforward compensator as known, and a residual vibration of the main body is damped by varying the feedback compensators (or a variable control system) within a scope not adversely affecting the motor positioning precision or accuracy. Thus, the two control objectives, namely, high-speed positioning of the movable member and reduction of vibration of the main body, can be achieved at high level. At the same time, there is obtained an effect to reduce an adverse influence of a vibration of the main body on stopping precision or accuracy of the movable member, which vibration is transmitted from another apparatus when the movable member is stopped.

(3) The operating apparatus according to the mode (2), wherein the first feedback compensator and the second feedback compensator are variable compensators such that basically a first degree at which the second operation command from the first feedback compensator affects the first operation command from the first feedforward compensator is higher than a second degree at which the third operation command from the second feedback compensator affects the first operation command, but the second degree is higher than the first degree when the movable member reaches a vicinity of a target position corresponding to the first position command outputted from the position command portion.

(4) The operating apparatus according to the mode (3), wherein a switching from the first feedback compensator to the second feedback compensator is made smoothly at a switching area where the movable member is in the vicinity of the target position.

(5) The operating apparatus according to the mode (4), wherein the control unit includes a switching-area changing portion which changes the switching area in accordance with at least one of a travel distance, a maximum movement speed, and a moving direction of the movable member, and a total mass of members to be moved with the movable member.

In order to achieve the two control objectives, that is, high-speed positioning of the movable member and reduction of vibration of the main body, at high level, it is significant to suitably determine the switching area at which the first feedback compensator and the second feedback compensator are switched, and in particular an initiation point of the switching. Where the control unit includes the switching-area changing portion, the switching area can be changed to suit at least one of the travel distance, maximum movement speed, and moving direction of the movable member, and the total mass of members to be moved with the movable member, whereby more excellently the two control objectives can be achieved.

Further, where the switching-area changing portion includes a learning portion which memorizes one of two switching areas before and after the change that is better than the other in regard to the speed of the positioning of the movable member and the reduction in vibration of the main body, the control characteristics of the control unit are automatically improved while the operating apparatus is in operation. Hence, at the stage of design, the time required to select or determine the switching area is reduced, while the two objectives can be achieved at high level.

(6) The operating apparatus according to any one of the modes (1) to (5), wherein the third feedforward compensator is expressed as a multiplication of a transfer characteristic of the first feedforward compensator from the position command to the first operation command by a transfer characteristic from the first operation command to an output of an acceleration detector.

By having the third feedforward compensator as defined in the mode (6), the third feedforward compensator outputs an acceleration response in a case where information on the position of the movable member that is obtained by the positional-information acquiring device follows the output of the second feedforward compensator.

(7) The operating apparatus according to any one of the modes (1) to (6), wherein the movable member is a linear movable member which linearly moves by being guided by a linear guide disposed on the main body.

The invention is applicable to an operating apparatus where the movable member is a rotary member rotated relative to the main body. However, where the movable member is a linear movable member, the movable member particularly tends to be affected by non-linear friction when the movable member is guided by a linear guide, and thus the effects of the invention are particularly significant.

(8) The operating apparatus according to the mode (7), wherein the drive unit includes a screw rod and a ball nut that are engaged with each other and linearly move the linear movable member by one of the screw rod and the ball nut being rotated by the drive source and the other of the screw rod and the ball nut being inhibited from rotating.

As a drive unit for driving the movable member guided by the linear guide, a linear motor or other devices than a combination of a rotational drive source and a ball screw may be employed. However, in a drive unit which drives a movable member by a combination of a rotational drive source and a ball screw, the ball screw tends to be affected by non-linear friction, and thus the effect of applying the invention is significant.

(9) The operating apparatus according to any one of the modes (1) to (8), further comprising:
a substrate holding device attached to the main body and holding a circuit substrate; and
a component mounting head attached to the movable member and holding an electronic-circuit-component, the component mounting head being moved with the movement of the movable member, in a direction parallel to a surface of the circuit substrate held by the substrate holding device, and attaching the electronic-circuit-component on the circuit substrate.

The mode (9) is an example of applying the invention to a mounting unit of an electronic-circuit-component mounting apparatus where it is required to move the movable member sequentially from point to another at high speed. It has been known to use a sensor and control a control quantity in a feedback manner, and it has been practiced to dispose an acceleration sensor for detecting an acceleration of the main body, in addition to a rotary encoder for detecting the rotational position of the drive source and a linear scale for detecting the position of the movable member, so as to implement a feedback control. However, for an operation to sequentially give operation commands to the drive source to sequentially move the movable member from one point to the next, as in an electronic-circuit-component mounting apparatus, it was not practiced to use an acceleration sensor to locate and settle the movable member at a desired position at high speed.

According to the mode (9), the accuracy or precision with which an electronic-circuit-component is mounted at a desired position on a circuit substrate by an electronic-circuit-component mounting apparatus is enhanced. Further, a vibration transmitted from a main body of the electronic-circuit-component mounting apparatus to the floor on which the mounting apparatus is installed is reduced.

(10) The operating apparatus according to the mode (9), wherein the main body includes a lower frame, a plurality of columns standing from the lower frame, and an upper frame supported by the columns, a first movable member is held by the upper frame such that the first movable member is movable in a first horizontal direction, a second movable member is held by the first movable member such that the second movable member is movable in a second horizontal direction perpendicular to the first horizontal direction, and the component mounting head is attached to the second movable member.

Where the main body is constructed according to the mode (9) and the first and second movable members are held by the upper frame and moved at high speed, the main body tends to vibrate when the movable members accelerate or decelerate, which vibration adversely affects the accuracy or precision of positioning of the movable member. In particular, where the substrate holding device is held by the lower frame and the mounting head is held by the upper frame, a mounting position or a relative position between the circuit substrate held by the substrate holding device and an electronic-circuit-component held by the mounting head at the time of mounting of the electronic-circuit-component on the circuit substrate is varied in a vibrating manner by a vibration of the main body, and thus the accuracy or precision of the mounting position at which the electronic-circuit-component is to be mounted on the circuit substrate tends to deteriorate. Hence, application of the invention to such a case is effective or significant. In this case, it is effective to dispose an acceleration sensor at a position as defined in the modes (12)-(14) described later, and disposing an acceleration sensor at a position as defined in the mode (16) or (17) is particularly effective.

(11) The operating apparatus according to the mode (10), wherein a plurality of the main bodies are supported by a common base, and the operating apparatus is formed on the common base.

A typical form of the operating apparatus according to the mode (11) is an electronic-circuit-component mounting system constructed such that a plurality of electronic-circuit-component mounting modules are placed and fixed on a single common base. In such an electronic-circuit-component mounting system, a vibration of one of the electronic-circuit-component mounting modules is transmitted to an adjacent electronic-circuit-component mounting module via the base. Hence, there may occur a situation where it is not sufficient to only reduce vibration of the main body due to movement of the movable member in each electronic-circuit-component mounting module. When the invention is applied to such a case, the vibration of the main body due to the vibration transmitted via the base is also reduced or damped, thereby enhancing the accuracy or precision in the mounting position of the electronic-circuit-component in the electronic-circuit-component mounting module. In this case, as described with respect to the mode (14), it is effective to dispose an acceleration sensor on the base.

It is noted that the feature of the mode (11) is applicable to the operating apparatus according to any one of the modes (1)-(9).

(12) The operating apparatus according to any one of the modes (1)-(11), wherein the acceleration-information acquiring device includes at least one acceleration sensor which is disposed at a position capable of detecting an acceleration of the main body in at least one of two directions perpendicular to each other in a horizontal plane.

In an operating apparatus in which a movable member is moved only in a direction parallel to a straight line, it is often the case that detection of an acceleration of the main body is required to be made merely in the direction parallel to the straight line. However, even where the movable member is moved only in a direction parallel to a straight line, there may be a case where the acceleration detection is desired to be made in two directions perpendicular to each other in a horizontal plane, depending on the structure of the main body and/or other conditions. In a case where the movable member is moved in two directions perpendicular to each other in a horizontal plane, it is generally desirable to detect an acceleration of the movable member in the two directions.

(13) The operating apparatus according to the mode (10) or (11), wherein the acceleration-information acquiring device includes at least one acceleration sensor disposed at least one place on at least one of a front surface, a rear surface, and a side surface of at least one of the lower frame, the columns, and the upper frame.

(14) The operating apparatus according to the mode (10), (11) or (13), wherein the acceleration-information acquiring device includes at least one acceleration sensor disposed at least one place on at least one of a front surface, a rear surface, and a side surface of at least one of the first movable member and the second movable member.

(15) The operating apparatus according to any one of the modes (10) and (12)-(14), wherein a plurality of the main bodies are supported by a common base, the operating apparatus is formed on the common base, and the acceleration-information acquiring device includes at least one acceleration sensor disposed at least one place on at least one of a front surface, a rear surface, and a side surface of the base.

(16) The operating apparatus according to any one of the modes (12)-(15), wherein the acceleration-information acquiring device includes at least two acceleration sensors, and obtains a difference between outputs of two of the at least two acceleration sensors as the information related to an acceleration of the main body.

When it is desired to reduce transmission of vibration from the operating apparatus to the floor on which the operating apparatus is installed, it is necessary to reduce vibration of the main body as a whole. However, where it is desired to reduce relative vibration between particular two portions, it can be effective to detect a difference between outputs of two acceleration sensors disposed on the two portions, as in the mode (17), and use the thus obtained difference in the control.

(17) The operating apparatus according to the mode (9)-(11), wherein the acceleration-information acquiring device includes a first acceleration sensor detecting an acceleration of a portion of the main body which holds the component mounting head, and a second acceleration sensor detecting an acceleration of a portion of the main body which holds the substrate holding device, the acceleration-information acquiring device obtaining a difference between an output of the first acceleration sensor and an output of the second acceleration sensor as the information related to an acceleration of the main body.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF PREFERRED EMBODIMENTS

Hereinafter, there will be described presently preferred embodiments of the invention, by referring to the accompanying drawings. It is noted that the claimable inventions are not limited to the details of the embodiments described below but may be otherwise embodied with various modifications and improvements that may occur to those skilled in the art, including the modes described above and without departing from the scope and spirit of the invention defined in the appended claims.

Figure 1:
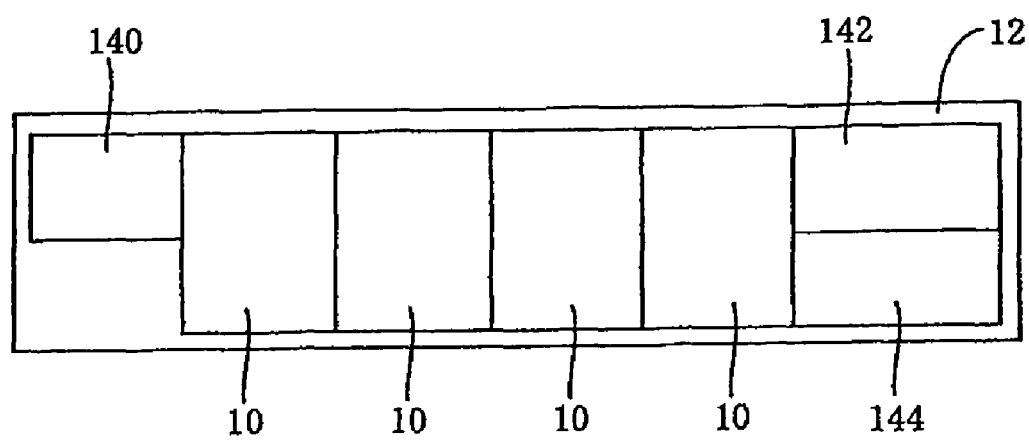
FIG. 1 is a plan view schematically showing an electronic-circuit-component mounting system including an embodiment of the claimable inventions.
Figure 1:
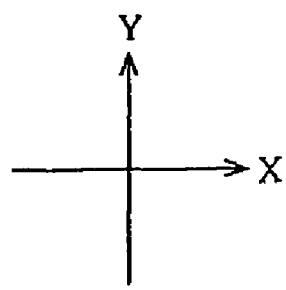

FIG. 1 schematically shows an electronic-circuit-component mounting system (hereinafter simply referred to as "mounting system") according to one embodiment of the claimable inventions. The mounting system includes a plurality of electronic-circuit-component mounting modules (hereinafter simply referred to as "mounting modules") 10. The mounting modules 10 are arranged in series on a system base 12 as a main body of the mounting system, and cooperate to mount electronic-circuit-components on a printed wiring board as a circuit substrate. The direction of arrangement of the mounting modules 10 will be referred to as "X-axis direction".

Figure 2:
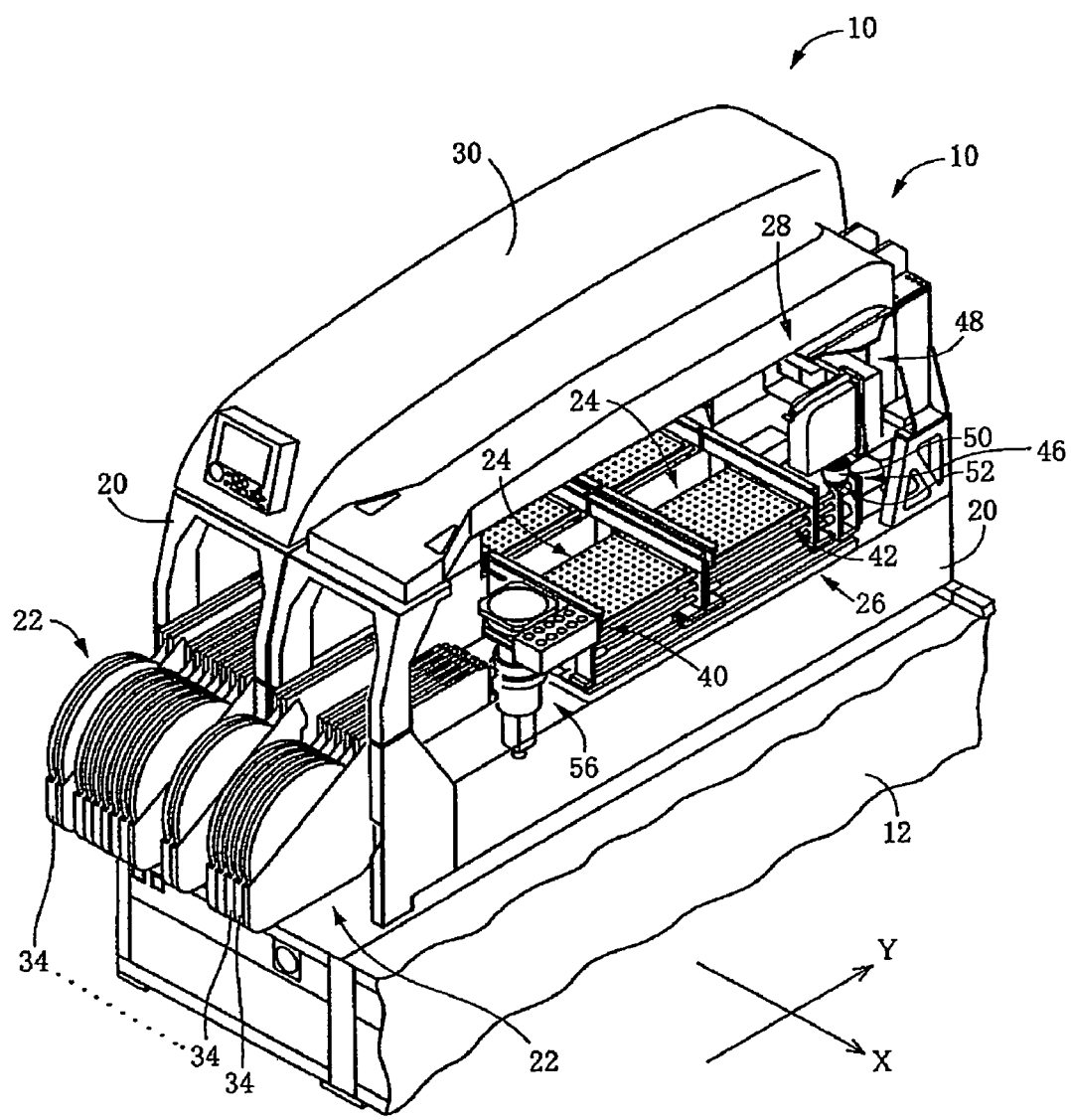
FIG. 2 is a perspective view of electronic-circuit-component mounting modules which are a component of the electronic-circuit-component mounting system shown in FIG. 1, and are an embodiment of the claimable inventions.

FIG. 2 shows two of the mounting modules 10. As shown in FIG. 2, each mounting module 10 includes a mainbody 20 and other members disposed on the mainbody 20 such as a component supply unit 22, a substrate holding device 24, a substrate feeder 26, and a mounting unit 28. The mounting modules 10 are attached to the system base 12 in a same way to construct the mounting system. FIG. 2 shows a state where a top cover 30 of one of the two mounting modules 10 is removed. Each mounting module 10 has a structure similar to that of a mounting module disclosed in JP-A-2004-104075, and will be described briefly.

For instance, the component supply unit 22 includes component supply feeders as a kind of component supply device. That is, the component supply unit 22 includes a plurality of tape feeders 34 each of which one by one supplies electronic-circuit-components off a component supply tape on which the electronic-circuit-components are adhesively attached. The tape feeders 34 are detachably installed on a palette (not shown) as a feeder supporting member, and attached with the palette to the module mainbody 20 so as to supply electronic-circuit-components.

The substrate feeder 26 has a plurality of substrate conveyors. For instance, two substrate conveyors 40, 42 are provided as in the present embodiment. Each of the substrate conveyors 40, 42 feeds a printed wiring board in the X-axis direction independently of each other. The substrate conveyors 40, 42 are disposed parallel to each other and adjacent to each other in a Y-axis direction which is perpendicular to the X-axis direction in a horizontal plane. Each of the substrate conveyors 40, 42 has a drive source in the form of a servo motor as a kind of electric motor, a pair of guide rails as a guide member, and a pair of conveyor belts as an endless wound member. By circulating the conveyor belts, a printed wiring board can be fed in two opposite directions, i.e., a forward direction and a reverse direction. That is, the mounting system has two conveyor lines, namely, a front conveyor line that is formed by aligning in series the substrate conveyors 40 of the mounting modules 10, and a rear conveyor line formed by aligning in series the substrate conveyors 42 of the mounting modules 10.

The mounting unit 28 includes a mounting head 46 and a mounting-head moving device 48, as shown in FIG. 2. In this embodiment, the mounting head 46 includes a main body 50 and at least one mounting unit 52 held by the main body 50. Each mounting unit 52 is held by the main body 50 such that the mounting unit 52 is vertically movable and rotatable around its own axis. The mounting unit 52 holds a suction nozzle as a kind of component holding member. The suction nozzle holds an electronic-circuit-component by sucking the electronic-circuit-component. There are prepared a plurality of kinds of mounting heads 46. For instance, the mounting heads 46 of the respective kinds hold different numbers of mounting units 52. The mounting head 46 is detachably held by the mounting-head moving device 48.

The mounting head 46 is moved to a desired position in a horizontal plane by the mounting-head moving device 48, which is a moving device of X-Y robot type disposed on the module mainbody 20. The mounting unit 52 is moved within an area across the component supply unit 22 and the substrate conveyor 40 or 42, and receives at its suction nozzle an electronic-circuit-component from one of the tape feeders 34 and mounts the electronic-circuit-component on a printed wiring board held by the substrate holding device 24. The mounting unit 52 is vertically moved, or elevated and lowered, by a mounting-unit lifting device (not shown) in order that the suction nozzle can receive and mount an electronic-circuit-component. Further, the mounting unit 52 is rotated about its axis by a mounting-unit rotating device (not shown). In this embodiment, the mounting-head moving device 48 and the mounting-unit lifting device cooperate to constitute a relative-movement giving device giving a relative movement between the mounting unit 52 and the substrate holding device 24 that is necessary for the mounting of an electronic-circuit-component.

The mounting-head moving device 48 includes a board imaging device 54 (shown in FIG. 6) having a CCD camera, and is moved to a desired position in a horizontal plane by the mounting-head moving device 48 so as to take an image of a printed wiring board.

In each of the mounting modules 10, a component imaging device 56 having a CCD camera is disposed between the component supply unit 22 and the substrate feeder 26. The component imaging device 56 takes an image of an electronic-circuit-component held by the mounting unit 52.

Figure 3:
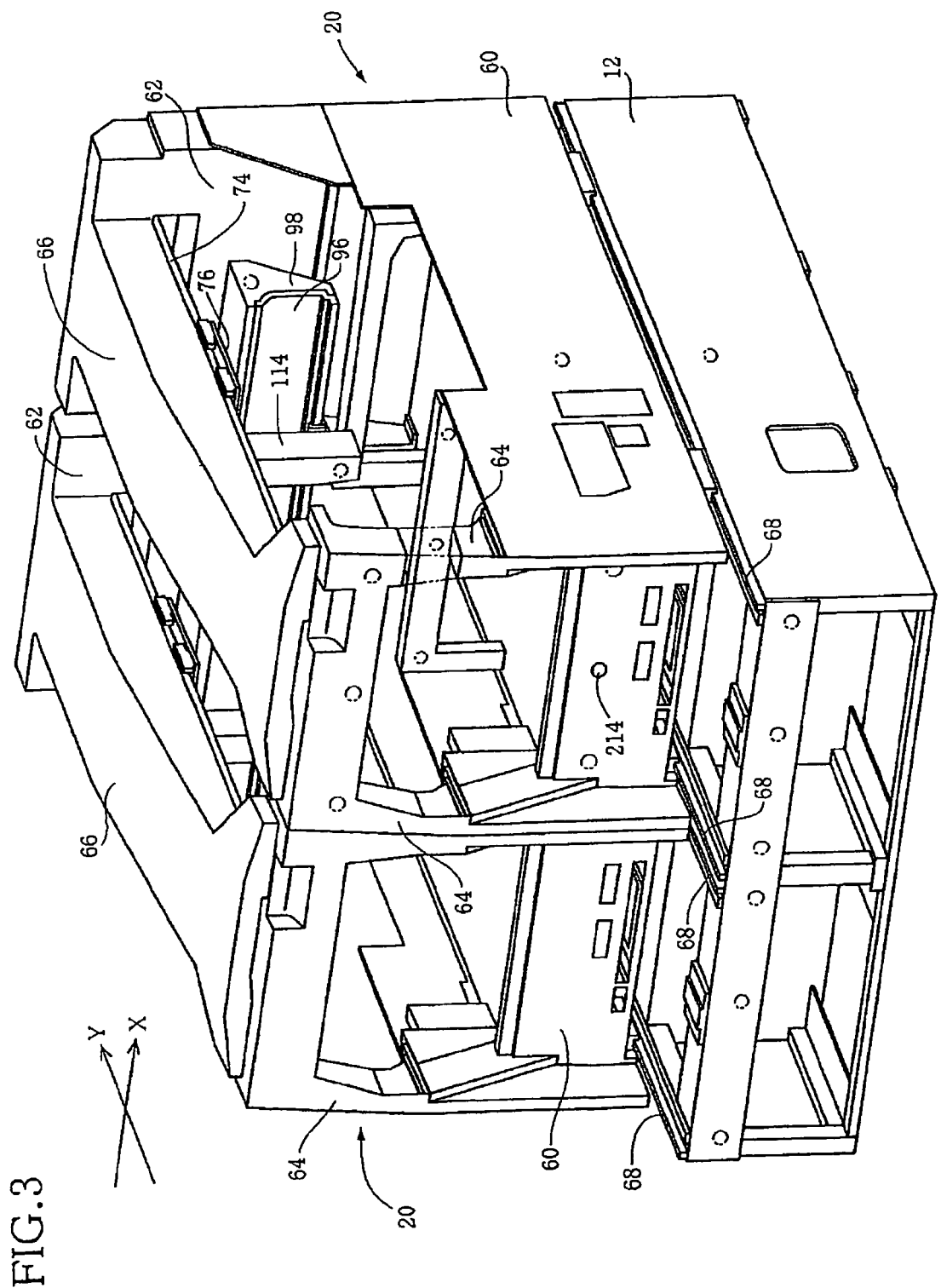
FIG. 3 is a perspective view showing main bodies of the electronic-circuit-component mounting modules.

The module mainbody 20 of the mounting module 10 is shown in FIG. 3. The module mainbody 20 includes a lower frame 60, a single rear column 62 and two front columns 64 that stand from the lower frame 60, and an upper frame 66 supported by the rear column 62 and the front columns 64. The lower frame 60 is supported by the system base 12. The module mainbodies 20 are supported by the system base 12 such that the module mainbodies 20 are movable in the Y-axis direction. The dimension of the module mainbody 20 in the Y-axis direction is larger than the dimension of the module mainbody 20 in the X-axis direction. In plan view, the module mainbody 20 has a substantially rectangular shape long in the Y-axis direction. Since a plurality of such module mainbodies 20 are arranged in the X-axis direction close to one another, it is difficult to reach deep inside the module mainbody 20, or accessibility to a deeper portion inside the module mainbody 20 is low. Hence, a plurality of pairs of guide rails 68 are disposed on an upper surface of the system base 12, and each of the module mainbodies 20 has a guided portion that is fitted on one of the pairs of the guide rails 68 in order that each module mainbody 20 can be pulled out in the Y-axis direction while being guided by the guide rails 68, independently of the other module mainbodies 20. While a module mainbody 20 is pulled out, it is possible to access the deeper portion inside the module mainbody 20. When such pulling out of a module mainbody 20 is to be implemented, a wheeled table or carriage (not shown) is first connected with the system base 12, and then the module mainbody 20 is pulled out onto the wheeled table. An entirety of each module mainbody 20 can be moved onto the wheeled table from the system base 12, and the module mainbody 20 can be carried on the wheeled table to a desired position. The number of mounting modules 10 disposed on the system base 12, and the order in which the mounting modules 10 are disposed on the system base 12, can be changed as desired. However, when the mounting modules 10 are to be operated, the module mainbodies 20 are fixed on the system base 12 by a fixing device (not shown) so that the module mainbodies 20 and the system base 12 function as if these 20, 12 form a single frame.

Figure 4:
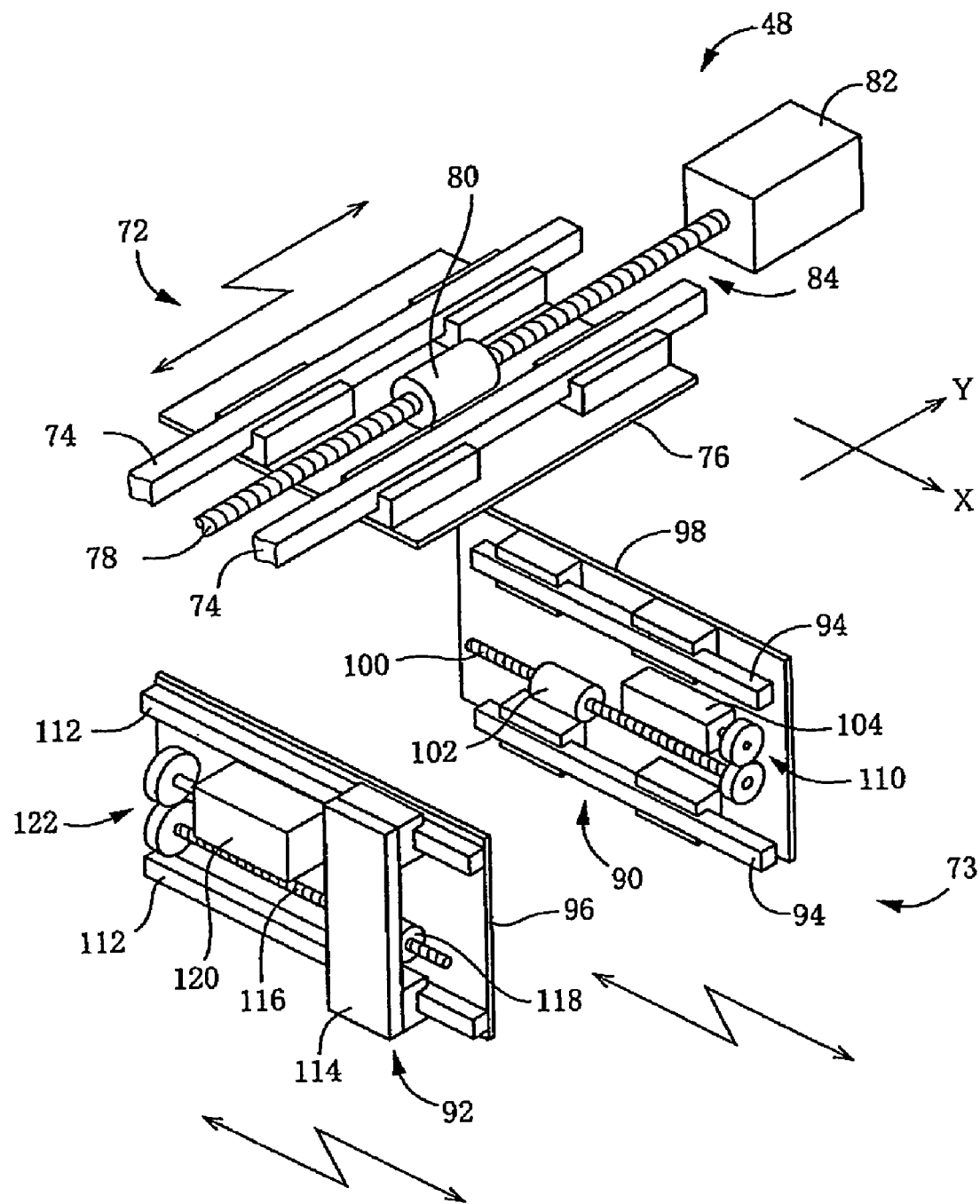
FIG. 4 is an exploded perspective view schematically showing a mounting-head moving device of each of the electronic-circuit-component mounting modules.

The mounting-head moving device 48 is schematically shown in FIG. 4. The mounting-head moving device 48 includes two linear moving devices that respectively move the mounting head 46 in two directions perpendicular to each other. One of the linear moving devices is a Y-slide device 72 for moving the mounting head 46 in a front-rear direction, i.e., the Y-axis direction which is perpendicular to the direction in which a printed wiring board is fed, and the other linear moving device is an X-slide device 73 for moving the mounting head 46 in a left-right direction, i.e., the X-axis direction which is parallel to a direction in which a printed wiring board is fed. The two linear moving devices cooperate to move the mounting head 46 to a desired position in a plane.

The Y-slide device 72 includes a pair of Y-axis guides 74 (hereinafter referred to as "Y-guides 74") disposed on the upper frame 66 parallel to the Y-axis direction, a Y-slide 76 that moves in the Y-axis direction while guided by the Y-guides 74, and a Y-drive unit 84. The Y-drive unit 84 is disposed on the upper frame 66 and includes a Y-screw rod 78 extending in the Y-axis direction, a Y-nut 80 screwed on the Y-screw rod 78 and thereby held on the Y-slide 76 such that the Y-nut 80 is rotatable and immovable relative to the Y-slide 76, and a Y-axis motor 82 which is an electric motor, more specifically, a servo motor with an encoder, which is disposed on the rear side of the Y-screw rod 78 and rotates the Y-screw rod 78. The Y-slide 76 and the members held by the Y-slide 76 including the X-slide device 73 and the mounting head 46 correspond to a movable member of the Y-slide device 72, and the Y-axis motor 82 corresponds to a drive source. The Y-guides 74 and a ball slide fixed on the Y-slide 76 cooperate to constitute a linear ball guide, and the Y-screw rod 78 and the Y-nut 80 cooperate to constitute a ball screw.

The X-slide device 73 is a moving device of a plurality of steps, namely, two steps. The X-slide device 73 includes two slide units, i.e., a first X-slide unit 90 and a second X-slide unit 92, whose moving directions are parallel to each other. The first X-slide unit 90 includes a first X-slide 96 having a pair of first X-axis guides 94 (hereinafter referred to as "first X-guides 94") extending in the X-axis direction, a slide holding portion 98 fixed on the Y-slide 76 and holding the first X-guides 94 such that the first X-guides 94 are slidable, a first X-screw rod 100 disposed on the slide holding portion 98 and extending in the X-axis direction, a first X-nut 102 screwed on the first X-screw rod 100 and held on the first X-slide 96 such that the first X-nut 102 is rotatable and immovable relative to the first X-slide 96, and a first X-axis motor 104 which is an electric motor, more specifically, a servo motor with an encoder, which is disposed on the slide holding portion 98 and rotates the first X-screw rod 100. The first X-screw rod 100, the first X-nut 102, and the first X-axis motor 104 cooperate to constitute a first X-drive unit 110 having the first X-axis motor 104 as a drive source. The second X-slide unit 92 includes a pair of a pair of second X-axis guides 112 (hereinafter referred to as "second X-guides 112") extending in the X-axis direction, a second X-slide 114 slidable on the second X-guides 112, a second X-screw rod 116 disposed on the first X-slide 96 and extending in the X-axis direction, a second X-nut 118 screwed on the second X-screw rod 116 and held on the second X-slide 114 such that the second X-nut 118 is rotatable and immovable relative to the second X-slide 114, and a second X-axis motor 120 which is an electric motor, more specifically, a servo motor with an encoder, which is disposed on the first X-slide 96 and rotates the second X-screw rod 116. The second X-screw rod 116, the second X-nut 118, and the second X-axis motor 120 cooperate to constitute a second X-drive unit 122 having the second X-axis motor 120 as a drive source.

The X-slide device 73 is a telescopic moving device having the X-slide device 73 of which a movable member is the second X-slide 114 which holds the mounting head 46. Rotations of the Y-axis motor 82, the first X-axis motor 104, and the second X-axis motor 120 are controlled to move the mounting head 46 in a plane and locate the mounting head 46 at a desired position within a working area.

To the substrate conveyor 40, 42, a printed wiring board is supplied by a board supplying device 140 shown in FIG. 1. The board supplying device 140 is disposed adjacent to the uppermost one of the mounting modules 10 arranged in series with respect to the direction of feeding of the printed wiring board, which is in this embodiment a direction in which a printed wiring board with no electronic circuit components mounted on either of two opposite sides thereof is fed when mounting of the electronic circuit component thereon is performed. This direction is from left to right in FIG. 1. The board supplying device 140 supplies a printed wiring board to the rear one 42 of the two substrate conveyors of the mounting modules 10.

On the downstream side of the substrate conveyor 42 or the arrangement of the mounting modules 10 with respect to the direction of feeding of printed wiring board, a reversing device 142 and a board feed-in device 144 are disposed. The reversing device 142 receives a printed wiring board from the most downstream mounting module 10, and turns over the printed wiring board to place the printed wiring board in the same position as when fed. That is, the reversing device 142 reverses the printed wiring board by rotating the printed wiring board 180 degrees about an axis extending parallel to the Y-axis direction and coinciding with a center of the printed wiring board. The board feed-in device 144 feeds the printed wiring board having been turned over by the reversing device 142 into the substrate conveyor 40 formed in the mounting modules 10 with the position or attitude of the printed wiring board maintained. In other words, the printed wiring board is fed into the substrate conveyor 40 from the side of the mounting module 10 most downstream of all the mounting modules 10 with respect to the direction of feeding of printed wiring board, without being rotated around an axis perpendicular to a surface of the printed wiring board.

Figure 5:
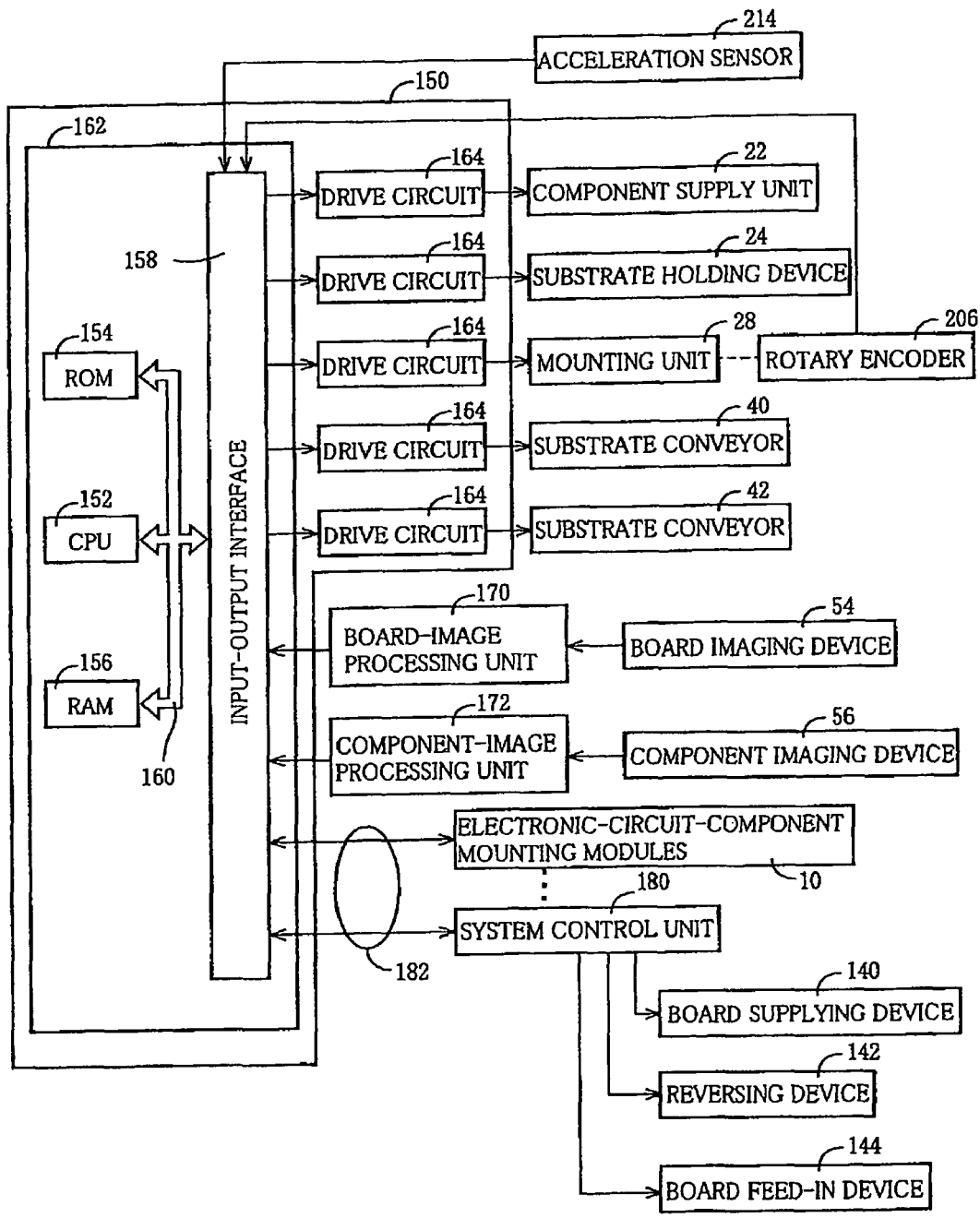
FIG. 5 is a block diagram illustrating a control unit for the electronic-circuit-component mounting module.

As shown in FIG. 5, each of the mounting modules 10 has a module control unit 150 for controlling various devices provided to the mounting modules 10 including the component supply unit 22. The module control unit 150 is mainly constituted by a computer 162 including a CPU 152, a ROM 154, a RAM 156, an input-output interface 158, and a bus 160 connecting these members 152-158 one another. The input-output interface 158 is connected with various members including the component supply unit 22, the substrate holding device 24, the mounting unit 28, and the substrate conveyors 40, 42, via respective drive circuits 164 included in the module control unit 150.

The input-output interface 158 is connected with the board imaging device 54 via a board-image processing unit 170, and with the component imaging device 56 via a component-image processing unit 172. Based on data of images taken, the input-output interface 158 obtains information on the attitude of an electronic-circuit-component held and information on a position error of a component mounting position on a printed wiring board, for instance. The ROM 154 stores a basic program for operating the mounting module 10 and others. The RAM 156 stores a component mounting program for mounting an electronic-circuit-component on a printed wiring board, information on an electronic-circuit-component to be mounted on a printed wiring board, and others. The component mounting program includes mounting order data, mounting position data, mounting component data, and other data that are preset for each of a plurality of kinds of printed wiring boards on which components are to be mounted. The component mounting program includes a first-surface program for mounting an electronic-circuit-component on a first surface of a printed wiring board, and a second-surface program for mounting an electronic-circuit-component on a second surface opposite to the first surface. The RAM 156 further stores various other kinds of data including data related to the component supply unit 22 such as data unique to each kind of electronic-circuit-component to be mounted, and data of location of the tape feeders 34 in the component supply unit 22, i.e., data on which kind of electronic-circuit-component is to be supplied from which tape feeder 34.

The mounting system includes a system control unit 180 controlling in an integrated manner an entirety of the mounting system including the mounting modules 10, the board supplying device 140, the reversing device 142, and the board feed-in device 144. The system control unit 180 is mainly constituted by a computer. The input-output interface 158 of the module control unit 150 is connected with the other mounting modules 10 and the system control unit 180 via a communication cable 182, and the module control unit 150 communicates with the system control unit 180 and the module control units 150 of the other mounting modules 10 so as to transfer information and an instruction therebetween, for instance.

When mounting of electronic-circuit-components is performed in each of the mounting modules 10 of the mounting system, the mounting head 46 is moved after having mounted one electronic-circuit-component on a printed wiring board at a mounting position therein so as to mount the next electronic-circuit-component at another mounting position in the printed wiring board. That is, the mounting head 46 is moved from the current position to the target position. It is required to implement this movement as fast as possible for improving the efficiency of the mounting operation, as well as to stop the mounting head 46 at the next position as precisely or accurately as possible for enhancing the accuracy or precision in the mounting position on the printed wiring board at which the next electronic-circuit-component is mounted. The precision or accuracy in the mounting position naturally depends on the precision or accuracy in the stop position of the drive source, but the precision or accuracy in the mounting position is also affected by a relative vibrational movement between the mounting head 46 and the substrate holding device 24 that results from a vibration of the mounting module 10 as a whole, and in particular, a vibration of the module mainbody 20. Hence, the Y-axis motor 82, the first X-axis motor 104, and the second X-axis motor 120 that are drive sources of the Y-slide device 72, the first X-slide unit 90, and the second X-slide unit, respectively, are controlled to enhance both the speed of positioning the mounting head 46 and performance of reducing vibration of the mounting module 10. This control is realized by implementing control software by the computer 162, and illustrated in a block diagram of FIG. 6 for facilitating comprehension.

For easier understanding, hereinafter the Y-slide device 72 having the Y-slide 76 which constitutes a major part of a movable member and is directly held by the module mainbody 20 will be described by way of example. However, the X-slide device 73 also can enhance both the positioning speed and the vibration reduction or damping performance in the same way as described below. Although the model of the X-slide device 73 is complex as compared to that of the Y-slide device 72 since the X-slide device 73 is held by the module mainbody 20 via the Y-slide device 72 and is a two-step moving device including the first X-slide unit 90 and the second X-slide unit 92, the Y-slide and X-slide devices 72, 73 can be controlled under same principles.

Figure 6:
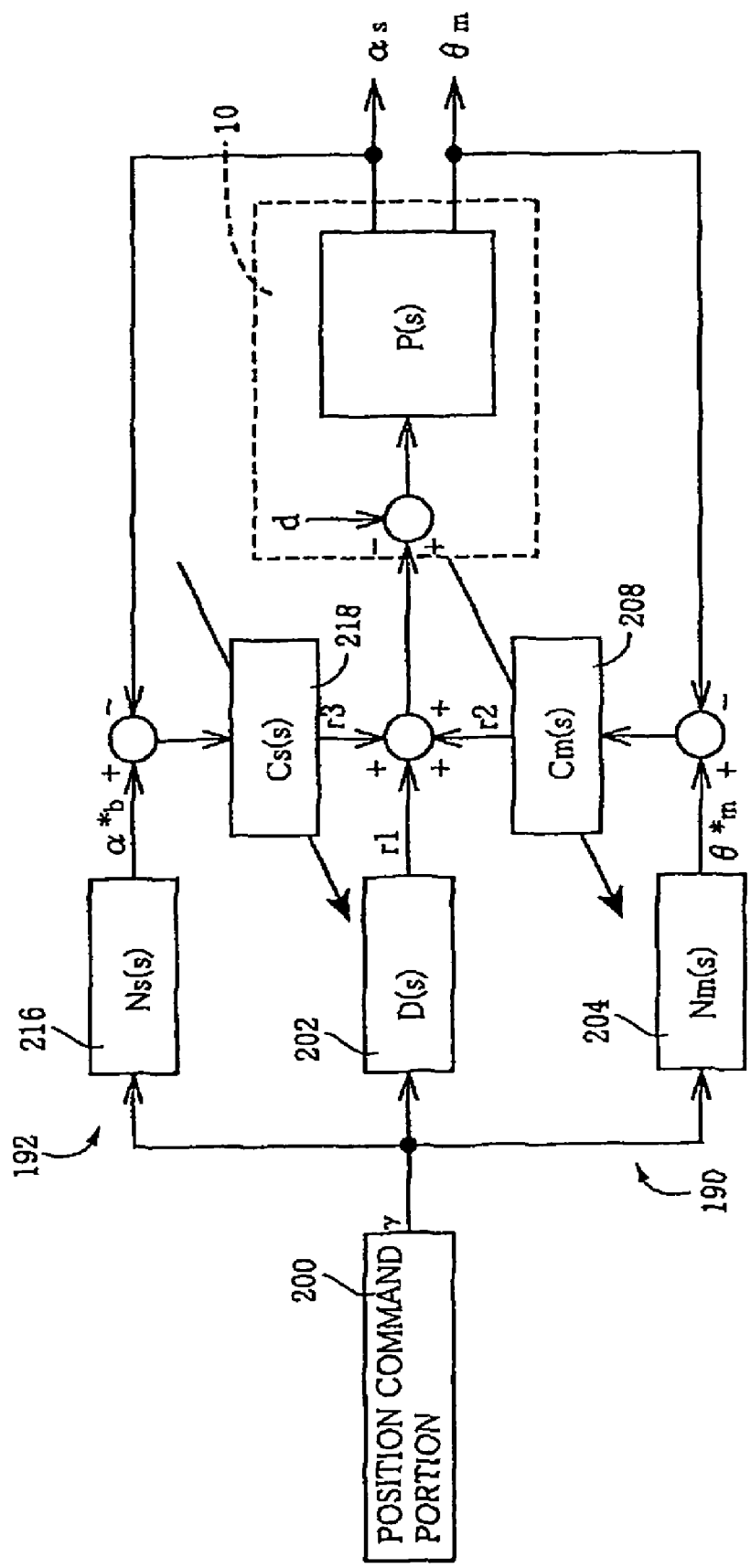
FIG. 6 is a block diagram schematically illustrating control software for controlling a Y-axis motor of the mounting-head moving device.

A control system shown in FIG. 6 is formed as a novel control system of two-degree of freedom by improving a known position control system of two-degree of freedom including the Y-slide 76 and the X-slide device 73 and the mounting head 46 held by the Y-slide 76 as a movable member, by (i) adding an acceleration control system, and (ii) making two feedback compensators variable. That is, an acceleration control system 192 is added to a position control system 190 as a known control system of two-degree of freedom, as well as feedback compensators 208, 218 of the position control system 190 and the acceleration control system 192 are made time-variant such that parameters of the compensators 208, 218 vary with time. The position control system 190 includes a position command portion that outputs a position command r, a feedforward compensator 202 that receives the position command r from the position command portion 200 and outputs a first operation command r1 to the Y-axis motor 82 as a drive source of an object to control, a feedforward compensator 204 that receives the position command r from the position command portion 200 and outputs, as another or second position command, a rotational position command θ*m, which is a command as to the rotational position of the Y-axis motor 82, a rotary encoder 206 (shown in FIG. 5) disposed on the Y-axis motor 82 as a positional-information acquiring device for obtaining information related to the movable member, and the feedback compensator 208 that receives a difference between the output θ*m of the feedforward compensator 204 and that θm of the rotary encoder 206 and outputs an operation command r2 to the Y-axis motor 82. The rotary encoder 206 is an absolute encoder, and the resolution of the rotary encoder 206 may take various values such as 2 μm, 5 μm, 10 μm per one pulse. The acceleration control system 192 includes an acceleration sensor 214 (shown in FIG. 5) as an acceleration-information acquiring device for obtaining information on an acceleration of the module mainbody 20, a feedforward compensator 216 that receives the position command r from the position command portion 200 and outputs an acceleration command α*b, and a feedback compensator 218 that receives as an input a difference between the output α*b of the feedforward compensator 216 and that αs of the acceleration sensor 214 and outputs an operation command r3 to the Y-axis motor 82.

As the acceleration-information acquiring device for obtaining information on an acceleration of the module mainbody 20, an acceleration sensor is disposed at least one of a plurality of locations indicated by white circles of chain double-dashed line in FIG. 3. As the information on the acceleration of the module mainbody 20, a set of acceleration value(s) each obtained as a result of detection of the at least one acceleration sensor, or a difference between or among a plurality of acceleration values obtained as results of detection by a plurality, e.g., two, acceleration sensors, respectively, may be used. However, for simplicity of illustration, there will be described a case where a single acceleration sensor 214 is disposed at the position indicated by a white circle of solid line in FIG. 3, i.e., the position in a central portion on a front surface of the lower frame 60, and an output of the acceleration sensor 214 is used as the information on the acceleration of the module mainbody 20. Although in this embodiment a servo accelerometer is employed as the acceleration sensor 214, other types of accelerometers such as piezoelectric type and capacitance type may be employed as the acceleration sensor 214.

A transfer characteristic D(s) of the feedforward compensator 202 and a transfer characteristic Nm(s) of the feedforward compensator 204 are designed by coprime factorization using a plant model between an electric current command as a torque command and the rotational position of the Y-axis motor 82, as known to the public and described in detail in JP-A-2004-240609, for instance. Further, a transfer characteristic Ns(s) of the feedforward compensator 216 is represented as a multiplication of the transfer characteristic D(s) which is a transfer characteristic of the feedforward compensator 202 between the position command r and the current command, and a transfer characteristic between the current command and an acceleration response of an attaching portion of the acceleration sensor 214, i.e., a mathematical mode Ps(s) described later, in order to ensure matching with the feedforward compensator 202. Where the transfer function Ns(s) is represented in this way, the feedforward compensator 216 outputs an acceleration response α*b in a case where a measured or observed quantity θm related to the positioning follows the output θ*m of Nm(s). To facilitate comprehension of the control system shown in FIG. 6, there will be described how this control system was developed.

Initially, a specific mounting module 10 including the Y-slide device 72 as a control object was selected. To obtain mathematical models Pm(s) and Ps(s) of the mounting module 10, frequency characteristics between the current command to the Y-axis motor 82 as a control input and the rotational position of the motor 82 and the mainbody acceleration were obtained, and the models Pm(s), Ps(s) were identified by differential iteration method based on mathematical models represented by the following expressions (1) and (2), respectively, where Kt represents a torque constant, Km, Ks represent modal coefficients, ξm, ξs represent modal damping ratios, ωn, ωs represent mode natural angular frequencies, and Tdm, Tds represent dead times:

[Expression 1]

$$P_m(s) = K_t e^{-T_{dm}s} \left( \frac{K_{m0}}{s^2} + \sum_{i=1}^{3} \frac{K_{mi}}{s^2 + 2\zeta_{mi}\omega_{mi}s + \omega_{mi}^2} \right) \quad (1)$$

[Expression 2]

$$P_s(s) = K_t e^{-T_{ds}s} \left( \sum_{i=1}^{3} \frac{K_{si}s^2}{s^2 + 2\zeta_{si}\omega_{si}s + \omega_{si}^2} \right) \quad (2)$$

Figure 7A:
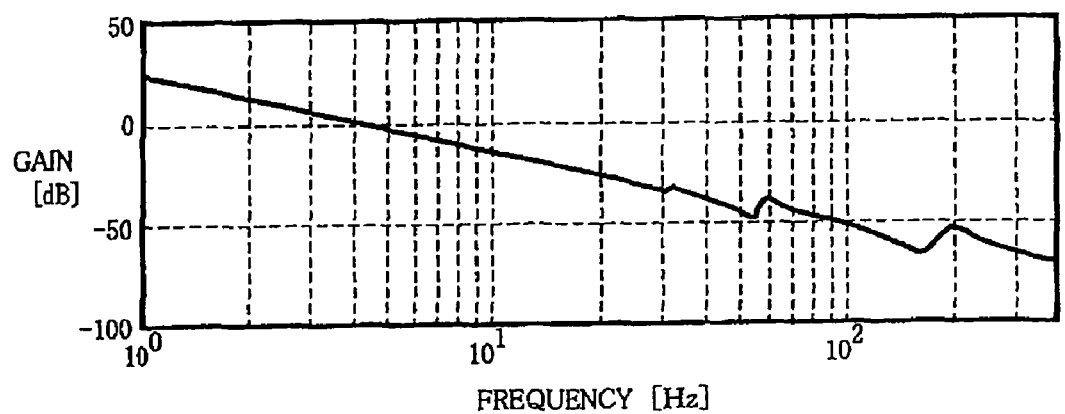
FIGS. 7A and 7B are graphs showing frequency characteristics of a Y-slide device of the mounting-head moving device.
Figure 7B:
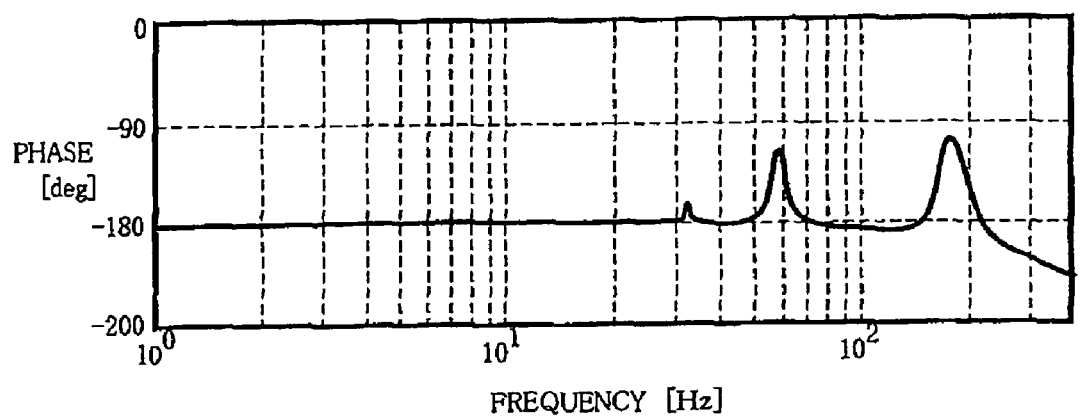
Figure 8A:
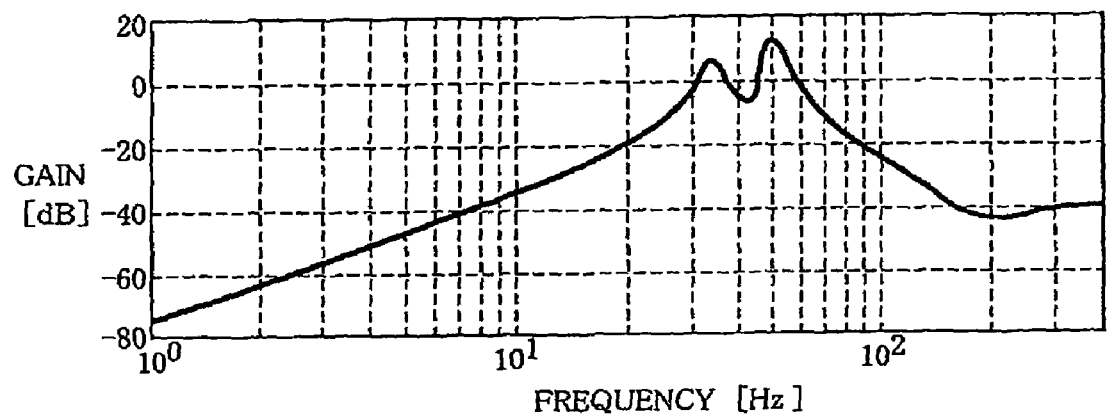
FIGS. 8A and 8B are graphs showing other frequency characteristics of the Y-slide device of the mounting-head moving device.
Figure 8B:
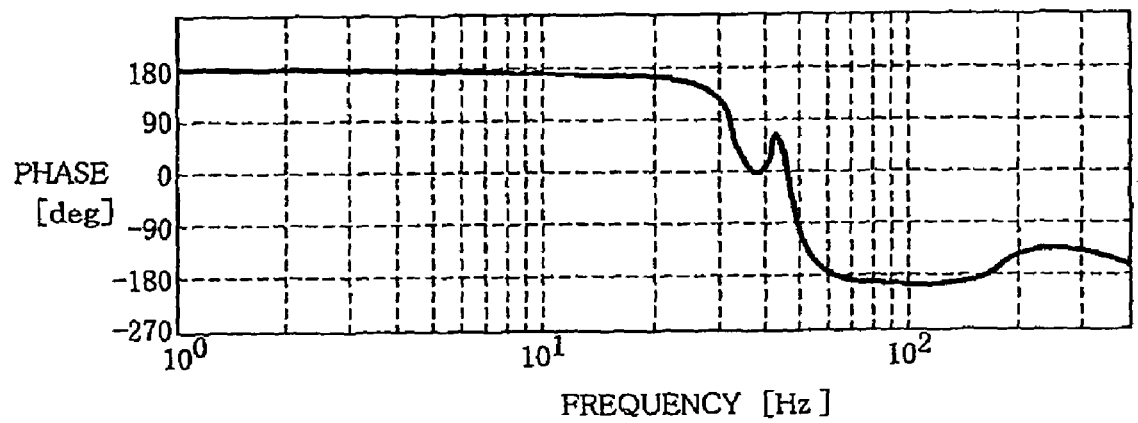

The frequency characteristics of the thus obtained mathematical models are shown in FIGS. 7-8B. As apparent from FIG. 7, there are included a first-order vibration mode (32 Hz) due to vibration of the module mainbody 20, and a second-order vibration mode (60 Hz) which is a mechanical vibration of the Y-slide device 72, and a third-order vibration mode (198 Hz) due to a flexibility of the Y-nut 80. As apparent from FIGS. 8A and 8B, a vibration system of the module mainbody 20 includes two vibration modes of 32 Hz and 49 Hz. In this specific example, target control specifications are determined as follows: For a 5 mm travel distance of the Y-slide 76, the Y-slide 76 is to be settled by 320 Ts and within a precision or accuracy of ±1 pulse of the rotary encoder 206, where Ts represents a unit sampling time.

Figure 9:
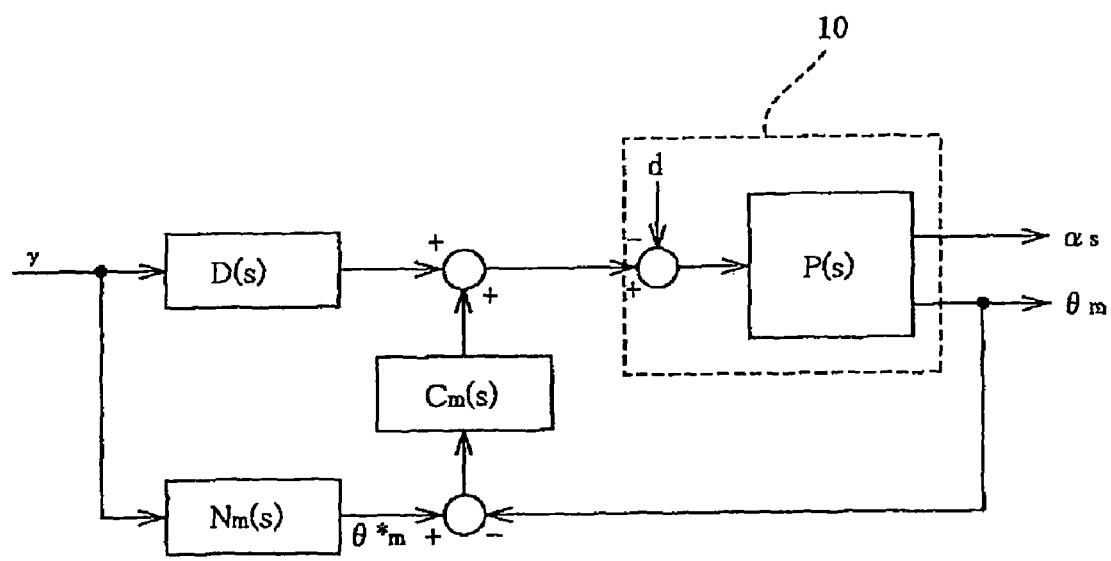
FIG. 9 is a block diagram schematically illustrating one of a plurality of pieces of software for controlling the Y-axis motor that were created during the process of creation of the control software shown in FIG. 6.

FIG. 9 shows a positioning control system of two-degree of freedom that is configured for controlling the mounting module 10 in the case of operating the Y-slide device 72. In FIG. 9, P(s) represents a plant characteristic of the mounting module 10, D(s) and Nm(s) represent feedforward compensators, Cm(s) represents a feedback compensator, and r, θm, as, and d respectively represent a position command, a motor rotational position, a vibrational acceleration of the module mainbody 20, and a disturbance. This positioning control system is a control system of two-degree of freedom including both a feedback system and a feedforward system. In the mounting module 10, non-linear friction at the linear ball guide and the ball screw described above acts as the disturbance d and lowers the positioning response behavior. In the control system of FIG. 9, if a modeling error does not exist between the mounting module 10 and the feedforward compensators D(s), Nm(s), and the disturbance and noise are sufficiently small, a desired response as determined by the feedforward compensators D(s), Nm(s) can be achieved. However, actually it is impossible to eliminate the modeling error and there does exist a disturbance d such as the non-linear friction, and thus a desired response cannot be achieved when only the feedforward compensators D(s), Nm(s) are employed. Hence, considering the modeling error to be included in the disturbance added to the control system along with the non-linear friction and others, the control system of FIG. 9 was designed to reduce the disturbance by the feedback compensator Cm(s), thereby achieving the desired response.

However, it was found difficult to reduce the disturbance to achieve the desired response while ensuring a stability of the system, under influence of high-order vibration modes, dead times, and other factors. Further, it was found that although in this control system the acceleration as of the module mainbody 20 is measured, the measurement is not utilized as feedback information fed back to control of a vibration system between the current command input to the Y-axis motor 82 and the acceleration of the module mainbody 20, as can be seen in FIG. 9, and this makes it difficult to enhance the positioning speed as well as the vibration damping capability (or vibration suppression).

Figure 10:
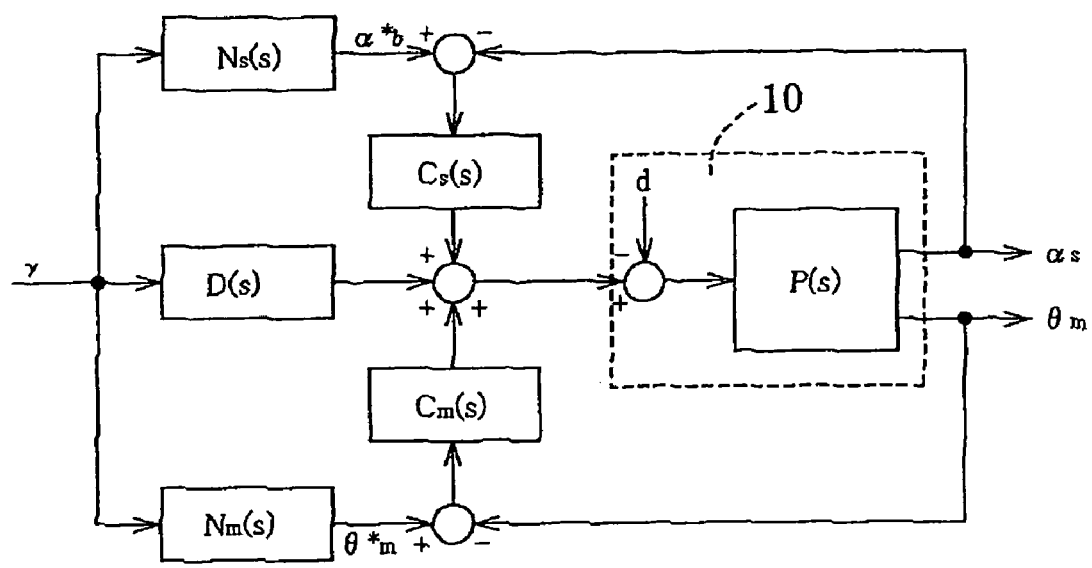
FIG. 10 is a block diagram schematically illustrating another of the pieces of software for controlling the Y-axis motor that were created during the process of creation of the control software shown in FIG. 6, and this piece of software is according to another embodiment of the claimable inventions.

To solve these problems, a control system shown in FIG. 10, which is another embodiment of the invention, was designed such that the acceleration as of the module mainbody 20 is fed back in order to actively suppress the vibration. This control system was built by adding to the control system of FIG. 9 an acceleration feedforward compensator Ns(s) and an acceleration feedback compensator Cs(s) that compensate for the acceleration of the module mainbody 20. To deal with this multivariable system, a control theory based on a state equation, more specifically, H' (H infinity) control theory that is a typical one of such control theories, is employed.

According to the control system shown in FIG. 10, both the positioning speed and the vibration damping capability are further enhanced as compared to the control system shown in FIG. 9.

In the control system of FIG. 10, target-value follow-up characteristics including a transient response is defined by feedforward compensators, and the feedback control system mainly greatly affects a residual vibration around and after the settling of the position.

Generally, a compensator designed by a linear time-invariant control system design method, e.g., state-quantity feedback control method, H∞ control method, and μ design method, can be described in terms of (or equivalently transformed into) frequency shaping, irrespective of how it was designed. Hence, many control systems are configured such that while a stability margin is ensured to a degree, a desired sensitivity characteristic is obtained at a critical frequency band. However, a high-order vibration mode, a dead time, sensor noise, and other factors may make it impossible to achieve the desired sensitivity characteristic while ensuring stability. Further, when assuming a control system where a stability margin is ensured to a degree, it is impossible to achieve a desired sensitivity characteristic across the entire frequency spectrum from Bode's sensitivity integral theorem, and it is inevitable that at a part of the frequency spectrum the obtained sensitivity is deviated from the desired value.

This also applies to the case of controlling the mounting module 10. In designing a control system, when the positioning response behavior is to be enhanced, it is desirable to emphasize lowering the sensitivity at low frequencies where influence of the non-linear friction which is a major component of the disturbance is great. On the other hand, when the capability of reducing or damping vibration of the module mainbody 20 is to be enhanced, it is desired to emphasize lowering the sensitivity at the frequency of a vibration of the module mainbody 20. However, it is difficult to enhance both the positioning speed and the vibration damping capability to a sufficiently high level because of the constraints described above.

Figure 11A:
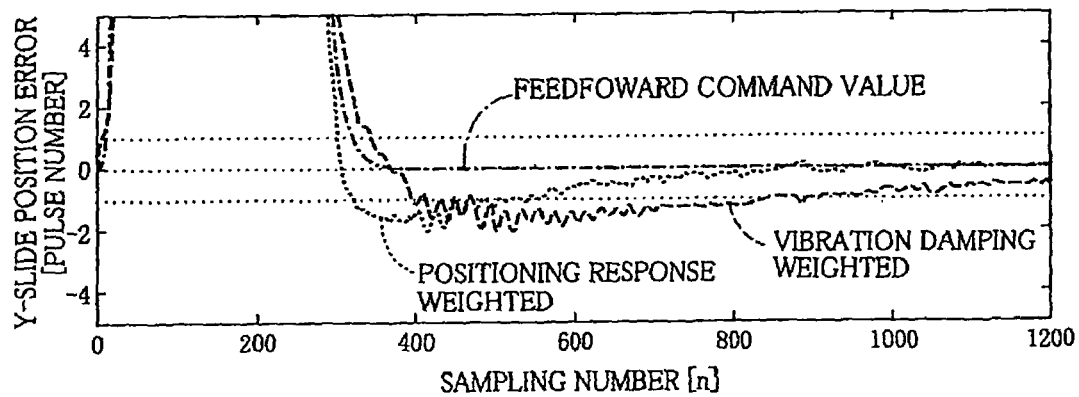
FIGS. 11A and 11B are graphs showing motor-position-error response waveforms and main-body-acceleration response waveforms in the case where a Y-axis slide unit is controlled by the control software of FIG. 10.
Figure 11B:
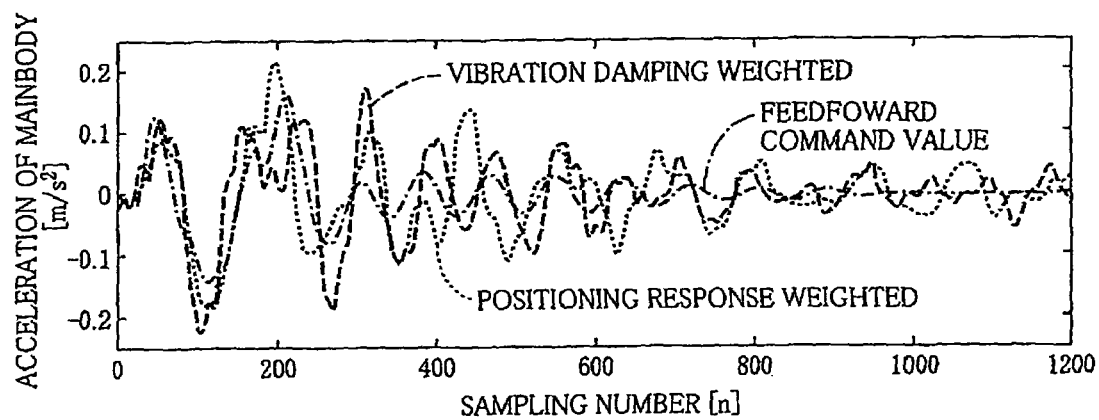
Figure 12A:
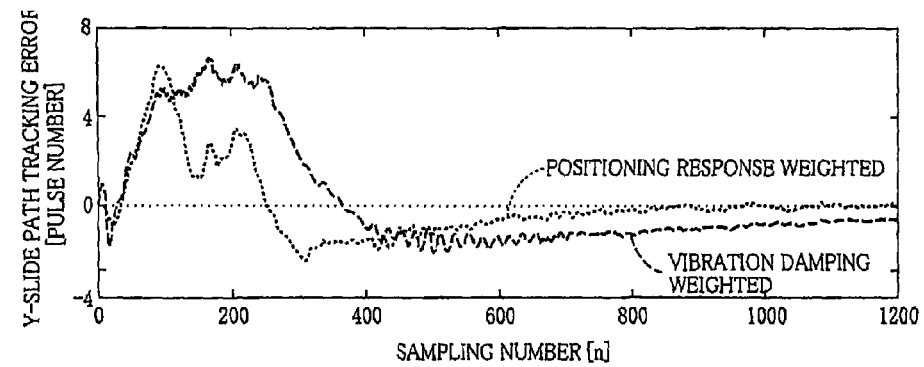
FIGS. 12A and 12B are graphs showing motor-path following errors and mainbody-acceleration-path following errors in the case where the Y-axis slide unit is controlled by the control software of FIG. 10.
Figure 12B:
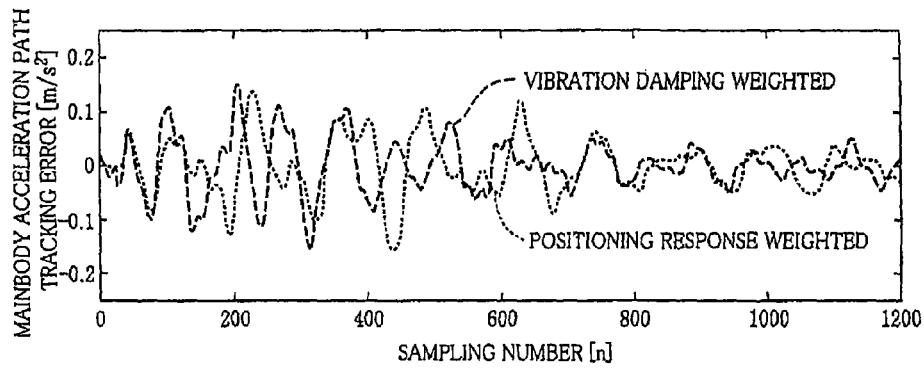
Figure 13A:
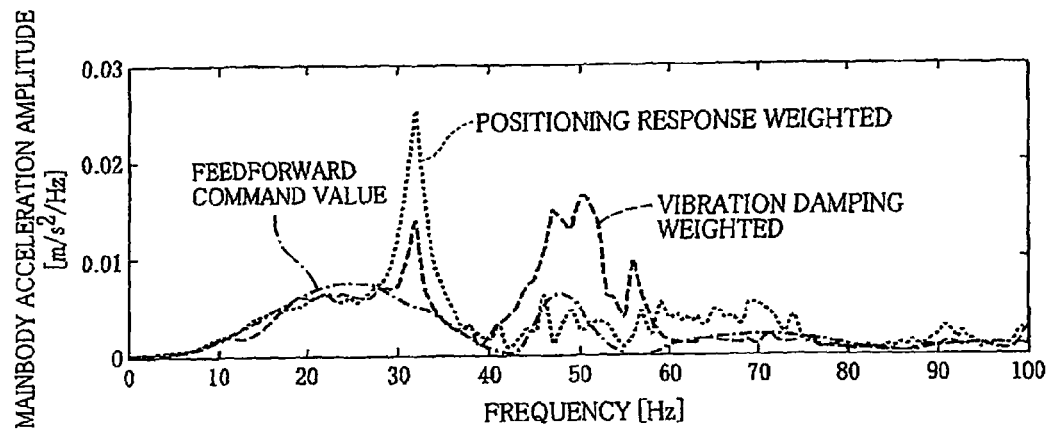
FIGS. 13A and 13B are graphs showing mainbody-acceleration frequency characteristics and mainbody-residual-acceleration frequency characteristics in the case where the Y-axis slide unit is controlled by the control software of FIG. 10.
Figure 13B:
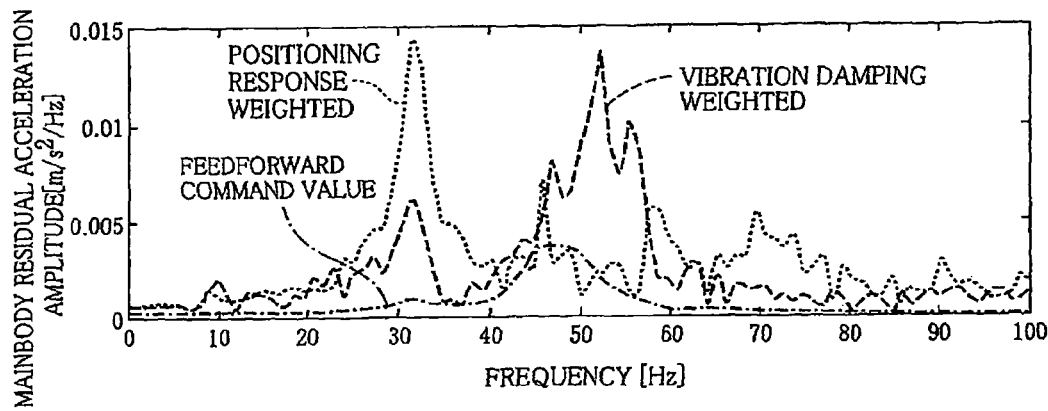

In order to confirm this fact, there was conducted an experiment with a mounting module 10 using a control system (hereinafter referred to as "controller 1") designed with the positioning response behavior emphasized or weighted, and a control system (hereinafter referred to as "controller 2") designed with the capability of damping vibration of the module mainbody 20 emphasized. The results of the experiment are shown in FIGS. 11-13, in which chain line, dotted line, and dashed line respectively indicate feedforward command value, a result obtained using the controller 1 designed with the positioning response behavior emphasized, and a result obtained using the controller 2 designed with the vibration damping capability emphasized. It is apparent from motor-position-error response waveforms shown in FIG. 11A that as compared to the control system where the positioning response behavior is emphasized and whose result is indicated by dotted line, the control system where the vibration damping capability is emphasized and whose result is indicated by dashed line is disadvantageous in the error convergence speed, that is, the latter system takes more time to reach the target value of position error. The same fact can be seen from motor-path following error waveforms shown in FIG. 12A. On the other hand, there is not seen a great difference between the two systems in module-mainbody acceleration response waveform and in acceleration-path following error waveform respectively shown in FIGS. 11B and 12B. However, it is seen from module-mainbody acceleration frequency characteristic shown in FIG. 13A and residual-acceleration frequency characteristic shown in FIG. 13B that the controller 2 designed with the vibration damping capability emphasized succeeds in damping a vibration around 32 Hz corresponding to the first-order vibration mode of the module mainbody 20, but fails to reduce, and adversely increases, the second-order vibration mode around 49 Hz. It was found that when components at 32 Hz and 49 Hz that are equal in acceleration amplitude are converted in displacements, the ratio of the displacement of the component of 32 Hz to that of 49 Hz is 1:0.43, meaning that in the displacement domain, the influence is great at low frequencies. This is because the controller 2, which is designed with the capability of damping vibration of the module mainbody 20 weighted, was especially aiming at damping the vibration at 32 Hz, as described later. It is noted that the residual acceleration of the module mainbody 20 corresponds to the acceleration response of the module mainbody 20 after 320 Ts defined in the target control specifications.

Thus, it was revealed that employment of a control system placing a particular emphasis on a characteristic at a specific frequency band enables to obtain a capability satisfying a design policy, but it is difficult to achieve at a high level a plurality of control objectives, namely, the positioning response behavior and the capability of damping vibration of the module mainbody 20 in the mounting module 10.

Therefore, the inventors made further improvement and obtained the control system shown in FIG. 6. This control system introduces a variable control system to achieve both the high-speed positioning and the satisfactory vibration damping capability.

It is already known to use a time-varying control system whose control characteristics vary with time, in order to obtain an excellent control of an object whose characteristics varies with time. However, it was not known to make a control system variable for the purpose of simultaneously achieving a plurality of control objectives, e.g., high-speed positioning and excellent vibration damping capability as in the present invention.

There will be described a concept of the variable control system, by referring to FIG. 14. Although the variable control system of the invention is not limited to a time-varying control system as described above whose control characteristics vary with time, hereinafter there will be described a time-varying control system by way of example only.

Figure 14A:
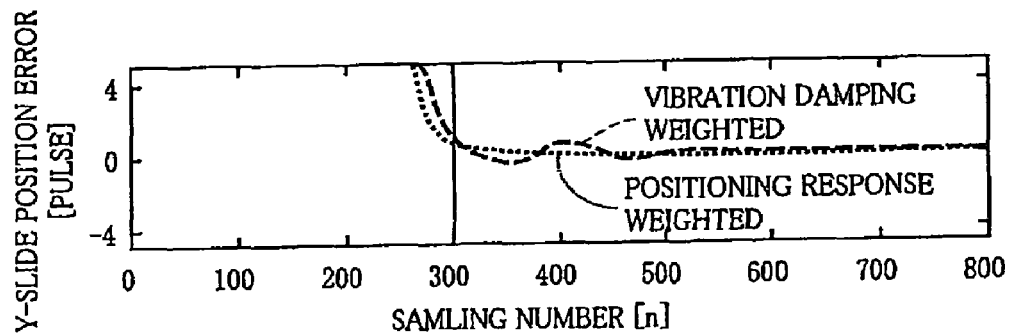
FIGS. 14A-14C are graphs illustrating a design concept of a time-varying control system realized by the control software of the FIG. 6.
Figure 14B:
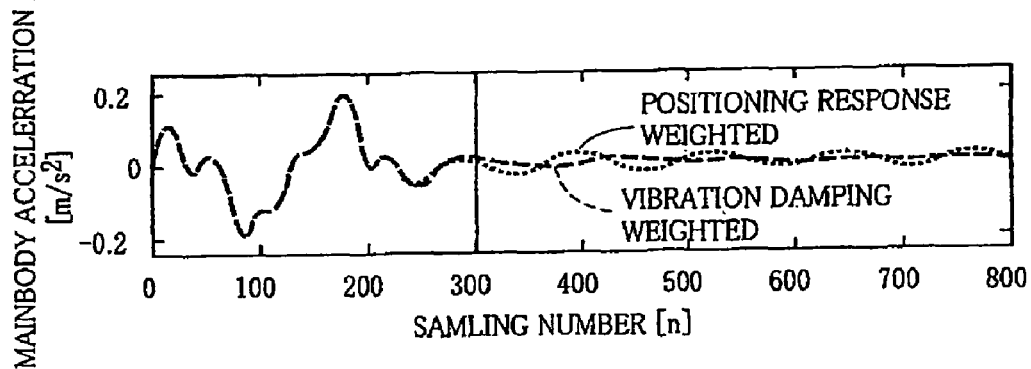
Figure 14C:
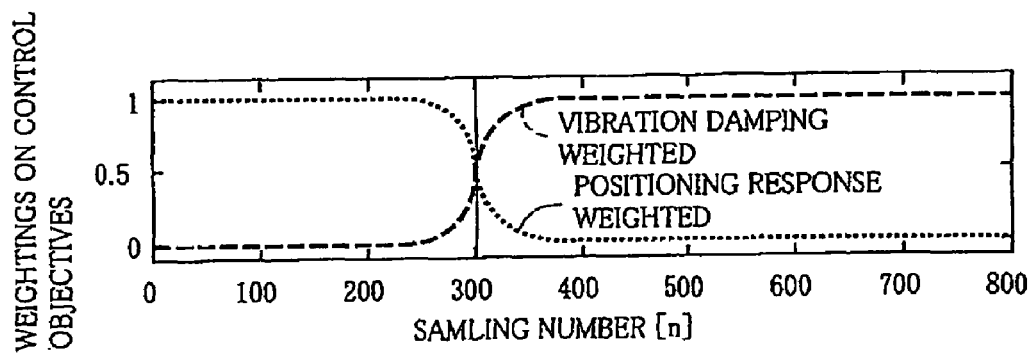

FIG. 14A shows rotational positioning response of the Y-axis motor 82, FIG. 14B shows acceleration response of the module mainbody 20, and FIG. 14C shows weighting or emphasis on the control objectives. In each of FIGS. 14A-14C, dotted line indicates one example of a response obtained with the control system where the response to positioning of the Y-axis motor 82 (or positioning response behavior) is weighted or emphasized, and broken line indicates one example of a response obtained with the control system where the capability of damping vibration of the module mainbody 20 is weighted or emphasized. According to the present time-varying control method, positioning of the Y-axis motor 82 is implemented such that from an initial time to a time point indicated by a vertical line in FIG. 14C in a process of positioning response, i.e., until the Y-axis motor 82 gets to the vicinity of the target value, the positioning control is implemented by the control system designed with positioning response behavior emphasized, and thereafter the control system is gradually or smoothly switched or changed with time to another control system for a different control objective or of a different design policy, i.e., the control system where the capability of reducing or damping vibration of the module mainbody 20 is emphasized, in order that the merits of both the two control systems are obtained in a time-variable manner to enhance the overall performance or capability of the positioning response system. That is, in the present control system, basic target-value follow-up characteristics are defined by feedforward compensators as in the known system, and the residual vibration of the module mainbody 20 is to be damped or reduced by changing feedback compensators, i.e., a time-varying control system, within a range not to lower precision or accuracy in positioning of the motor. This control system can also reduce an adverse influence of a vibration of the module mainbody 20 on stopping precision or accuracy of the Y-axis motor 82, which vibration is transmitted from another apparatus when the Y-axis motor 82 is stopped.

There will be described designing of the time-varying control system by illustrating a case using frozen parameter method which is a typical design method of gain scheduling. The control system was designed following the procedure below:
(1) Design a plurality of compensators desirable for a respective plurality of periods during the whole period of positioning. For instance, the periods may be a first period from an initial time to a time point when the object is settled at the target position, and a second period after the time point.
(2) Determine the timing(s) at which the compensators are switched from one to another.
(3) Based on the compensators designed in the step (1) and the switching timing(s) determined in the step (2), a time-varying compensator corresponding to the entire time period of positioning response is obtained by interpolation.

In the step (1), known control-system design methods and their results are usable without any processing since each compensator can be designed as a linear time-invariant control system.

For instance, as the time-varying compensator may be employed one represented in the following expression (3) and having characteristics expressed as a constant gain Cc(s, t) from the initial time to 0.2 s (first stage), and as a notch filter Cn(s, t) from 0.2 s to 0.3 s (second stage). It is noted that although it is not mathematically strict, each of the first and second stages of the compensator will be represented as Cc(s, t) and Cn(s, t) for facilitating comprehension.

[Expression 3]

$$C_c(s, t) = 1 \rightarrow C_n(s, t) = \frac{\omega_d^2}{\omega_n^2} \frac{s^2 + 2\zeta_n \omega_n s + \omega_n^2}{s^2 + 2\zeta_d \omega_d s + \omega_d^2} \quad (3)$$

Figure 15:
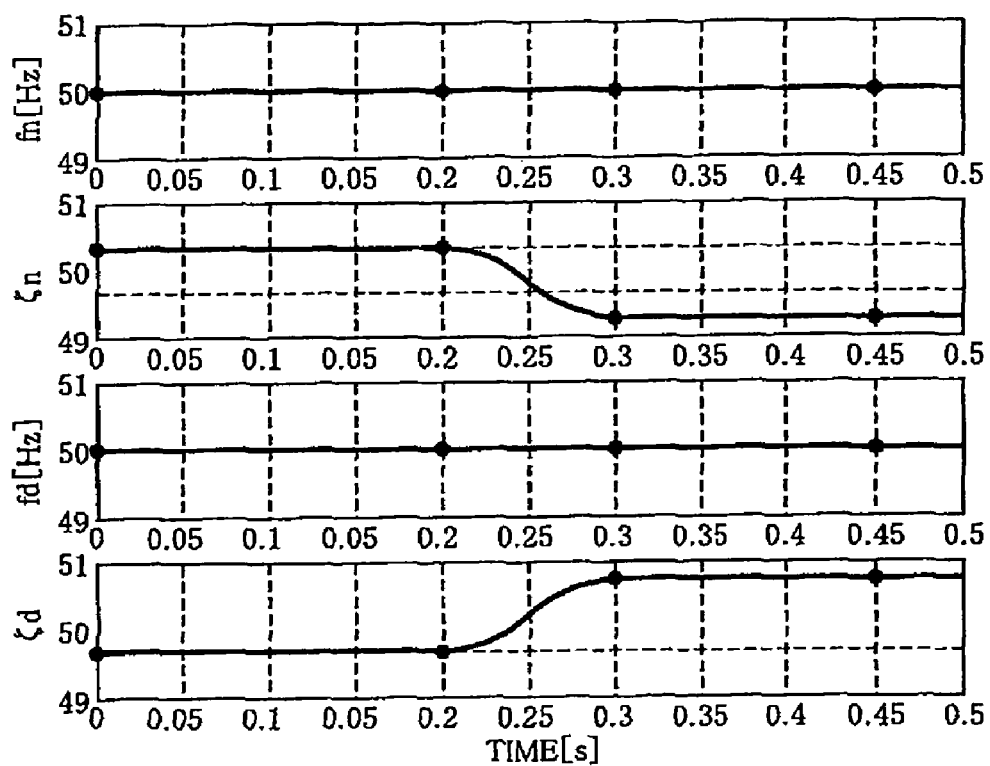
FIG. 15 illustrates parameters of time-variant feedback compensators realized by the control software of FIG. 6.

FIG. 15 shows parameters of the time-varying compensator. In FIG. 15, black circles denote parameters beforehand designed as the time-invariant compensators, and solid line denotes parameters at sampling times of the time-varying compensator. In this case, the constant gain Cc(s,t) and the notch filter Cn(s,t) are designed beforehand as time-invariant compensators, and a time-varying compensator is obtained by realizing a constant of 1 from an initial time to 0.2 s by pole-zero cancellation and changing the parameters with time (i.e., implementing interpolation) from 0.2 s to 0.3 s. In the present embodiment, the period of time from 0.2 s to 0.3 s, i.e., the second stage, corresponds to a switching or transition area at which switching from a control system designed with the positioning response behavior emphasized to another control system designed with the vibration damping capability emphasized.

Figure 16A:
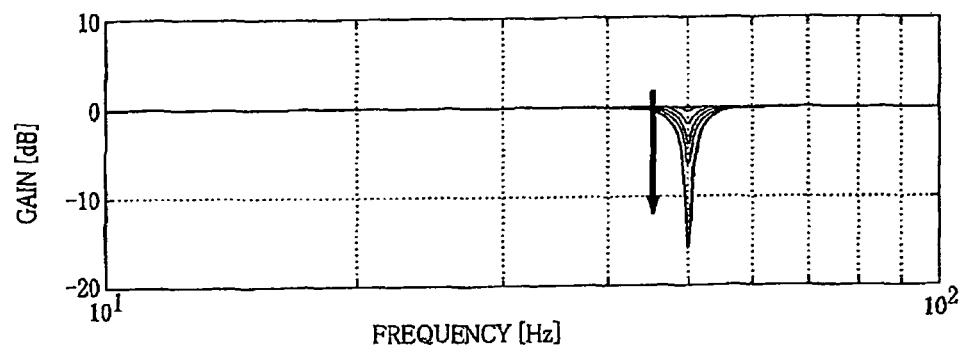
FIGS. 16A and 16B are Bode plots showing characteristics of the time-varying control system including the time-variant feedback compensators.
Figure 16B:
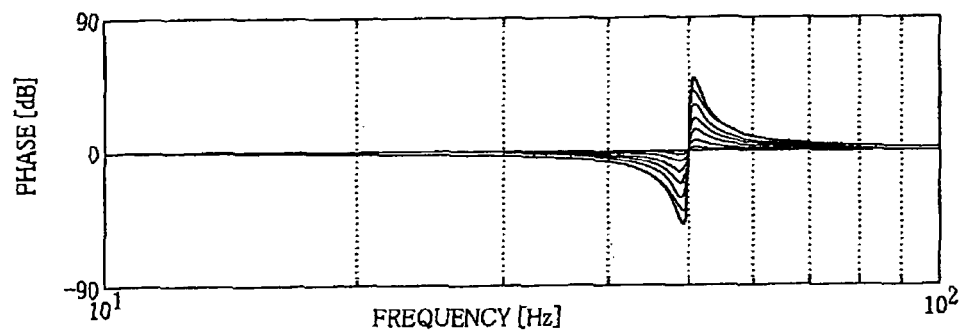
Figure 17A:
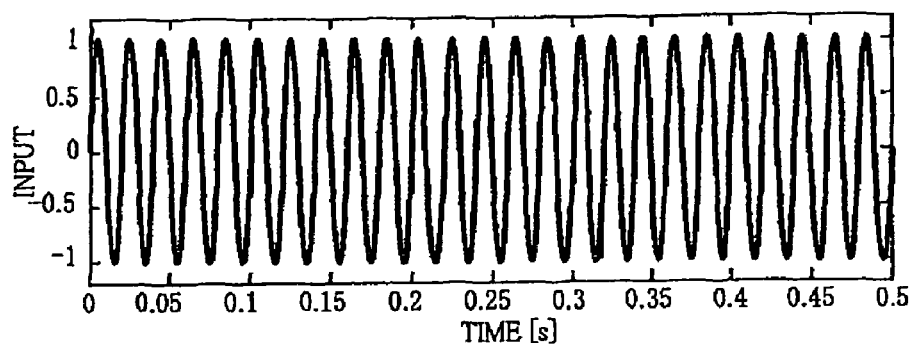
FIGS. 17A and 17B are graphs showing a time response characteristic observed when sinusoidal waves of attenuation frequencies of notch filters are inputted to the time-variant feedback compensators.
Figure 17B:
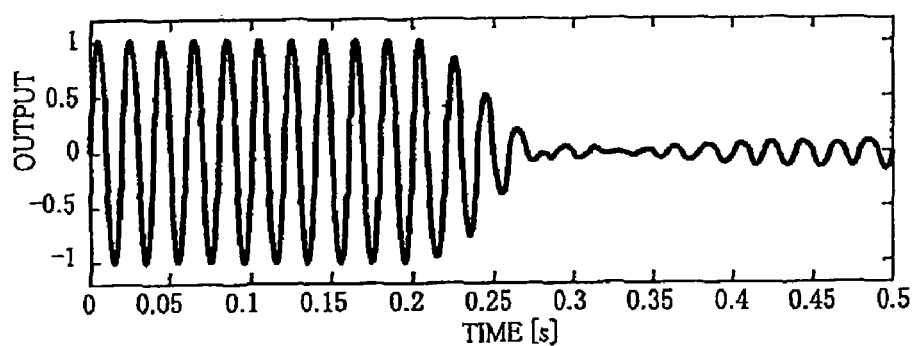
Figure 18A:
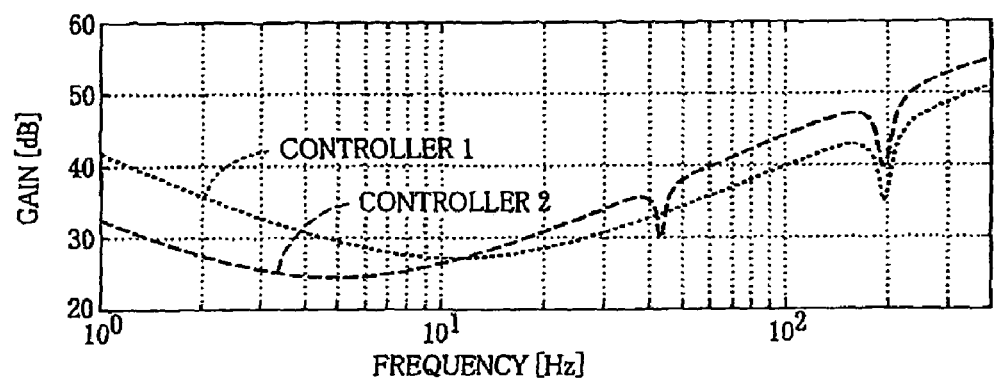
FIGS. 18A and 18B are graphs showing characteristics of a time-variant feedback compensator for motor position compensation.
Figure 18B:
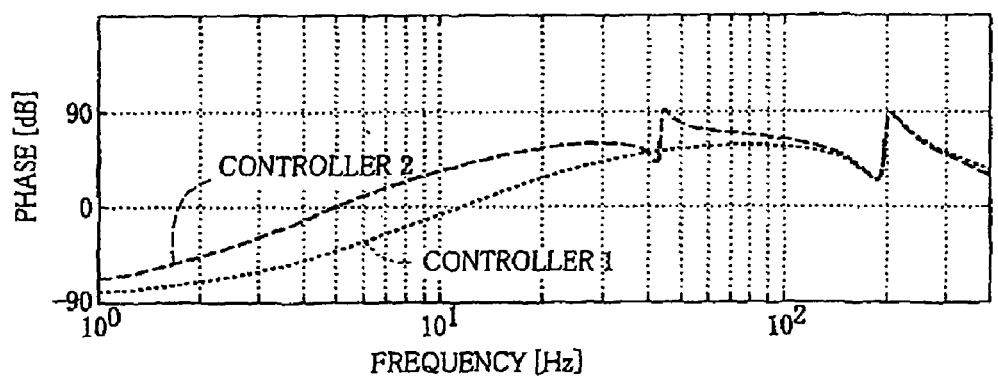
Figure 19A:
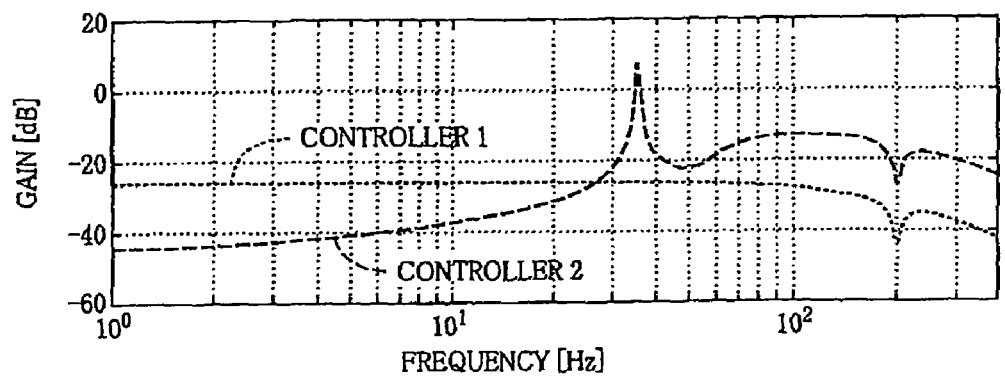
FIGS. 19A and 19B are graphs showing characteristics of a time-variant feedback compensator for mainbody acceleration compensation.
Figure 19B:
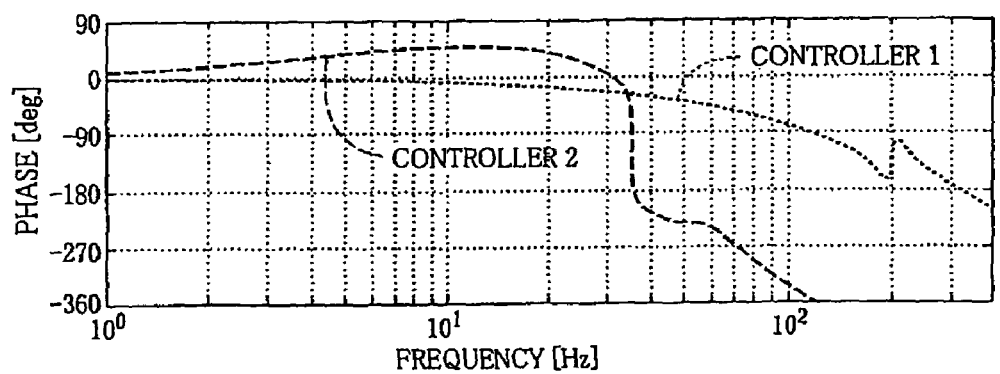

FIGS. 16A and 16B are Bode plots showing characteristics of the time-varying control system, from which it is confirmed that the characteristics thereof gradually or smoothly changes from that of the constant gain to that of the notch filter. FIGS. 17A and 17B show time response characteristics observed when a sinusoid of an attenuation frequency of the notch filter is inputted to the time-varying compensator. That is, FIGS. 17A and 17B show that the compensator gradually changes or transforms with time, indicating that a time-varying compensator can be designed by the above-described procedure of designing a time-varying control system.

In this way, even when the numbers of poles and zeros differ before and after a time point where the characteristics of a compensator change or transform, it is possible to utilize pole-zero cancellation and a zero or zeros near a Nyquist frequency so as to keep the numbers of poles and zeros constant, whereby time-varying control systems having various characteristics can be obtained.

There will be described how time-invariant control systems are designed to be used in designing the time-varying control system for the mounting module 10. A block diagram of each of the time-invariant control systems corresponds to that of FIG. 6. The design of the time-invariant control systems is premised on the assumption that the time-invariant control systems are to be expanded or developed to the time-varying control system. In view of the complexity of designing the time-varying control system, there are designed two types of time-invariant control systems, namely, the controller 1 which is a control system designed with the positioning response behavior emphasized, and the controller 2 which is a control system designed with the capability of damping vibration of the module mainbody 20. In designing the control systems, evaluation indices respectively defined as Expressions (4)-(6) are used for evaluating each designed control system: open-loop transfer characteristic L(s), motor-rotational-position sensitivity characteristic Sm(s), and module-mainbody acceleration sensitivity characteristic Ss(s).

[Expression 4]
$$L(s) = P_m(s)C_m(s) + P_s(s)C_s(s) \quad (4)$$

[Expression 5]
$$S_m(s) = \frac{1 + P_s(s)C_s(s)}{1 + L(s)} \quad (5)$$

[Expression 6]
$$S_s(s) = \frac{1 + P_m(s)C_m(s)}{1 + L(s)} \quad (6)$$

With the open-loop transfer characteristic L(s), the motor-rotational-position sensitivity characteristic Sm(s), and the acceleration sensitivity characteristic Ss(s), the stability of a closed-loop system, the response to positioning of the Y-axis motor 82, and the capability of damping vibration of the module mainbody 20 are evaluated, respectively. The motor-rotational-position sensitivity characteristic is a characteristic from a disturbance on an output terminal of the Y-axis motor 82 to a rotational position of the Y-axis motor 82, and the acceleration sensitivity characteristic is a characteristic from a disturbance on an acceleration output terminal of the module mainbody 20 to an acceleration of the module mainbody 20.

In designing the control systems, the following are to be satisfied:
(i) An integrator should be included in Cm(s) in order to compensate for a steady-state error in the motor position response, that is, an integral control mode is to be ensured in the control system.

(ii) Taking account of a measuring frequency band (about 0-200 Hz) of the servo accelerometer, Cs(s) should exhibit a particularly excellent damping characteristic at high frequencies.

Therefore, the time-invariant control systems (i.e., the controllers 1 and 2) are to be designed such that the controller 1 has a sensitivity characteristic such that the sensitivity is high at low frequencies, which means that the gain of Cm(s) is large at low frequencies, and the controller 2 especially aiming at reducing the residual vibration of the module mainbody 20 has an acceleration sensitivity characteristic such that the acceleration sensitivity decreases around the 32 Hz first-order vibration mode of the module mainbody 20. Thus, it is determined to form Cm(s) based on a PID compensator and add a stabilization filter thereto, and to form Cs(s) based on a PD compensator and add a stabilization filter thereto.

Figure 20A:
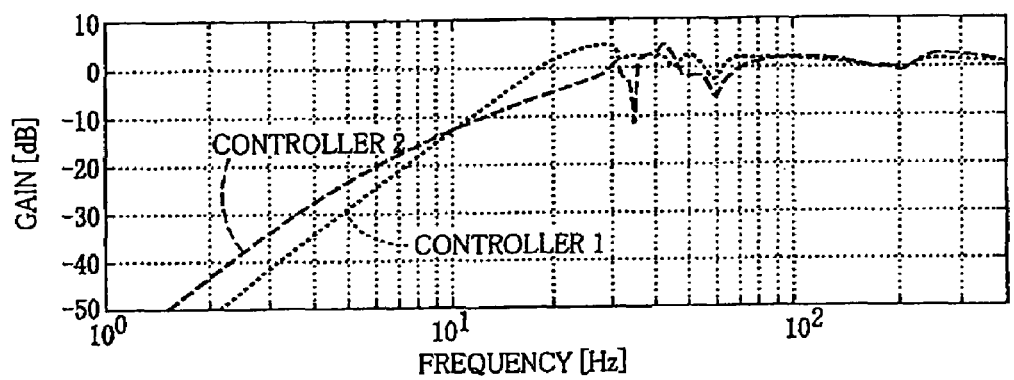
FIGS. 20A and 20B are graphs respectively showing motor position sensitivity characteristics of the time-variant feedback compensator for motor position compensation, and acceleration sensitivity characteristics of the time-variant feedback compensator for mainbody acceleration compensation.
Figure 20B:
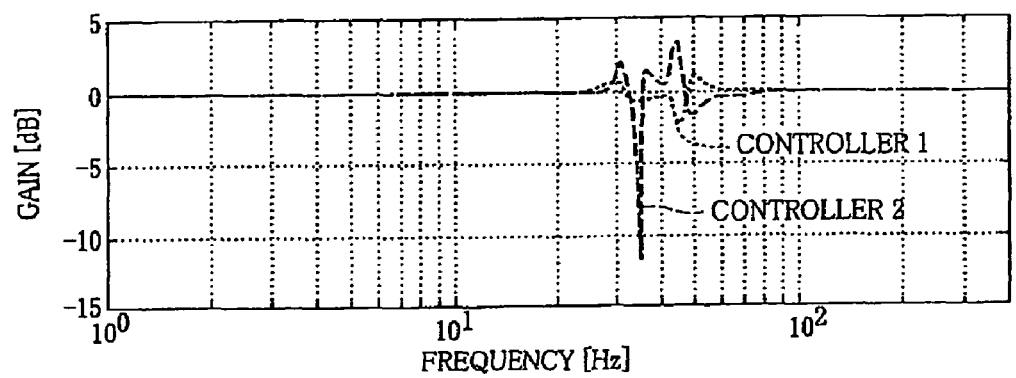
Figure 21:
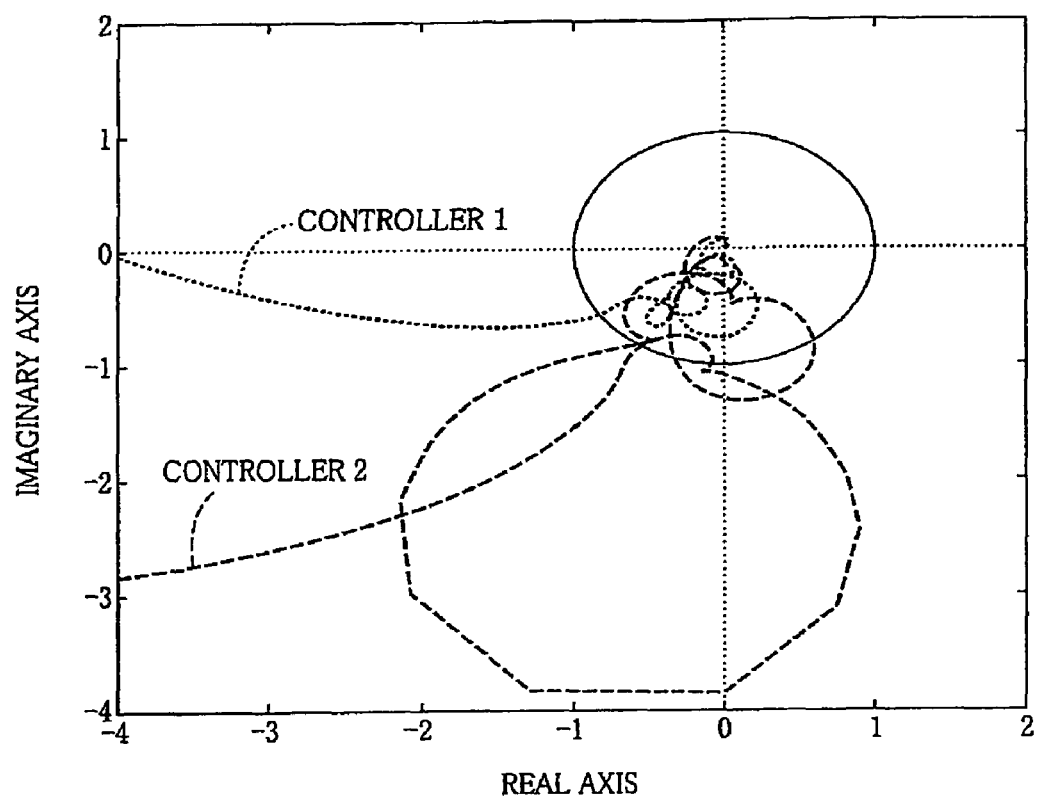
FIG. 21 is a Nyquist plot of the time-variant feedback compensators for motor position compensation and for mainbody acceleration compensation.

FIGS. 18A-19B show characteristics of the thus designed compensators, FIGS. 20A and 20B respectively show motor position sensitivity characteristics (gain characteristics only) and acceleration sensitivity characteristics (gain characteristics only), and FIG. 21 is a Nyquist plot. In each of FIGS. 18A-21, dotted line indicates a characteristic of the controller 1 and dashed line indicates a characteristic of the controller 2. From FIGS. 18A-21, it is seen that in the controller 1 the motor position sensitivity is successfully lowered at the low frequencies by having the gain relatively large at the low frequencies, and that in the controller 2 the acceleration sensitivity is successfully lowered to about −10 dB around the 32 Hz first-order vibration mode of the module mainbody 20, in accordance with the design policy. In the controller 2, the above-described characteristic is realized by forming a control system in which an unstable zero is introduced in Cs(s) to positively utilize the phase characteristic. Further, from FIG. 21 it is seen that in both the control systems a sufficient stability margin is ensured.

Figure 22:
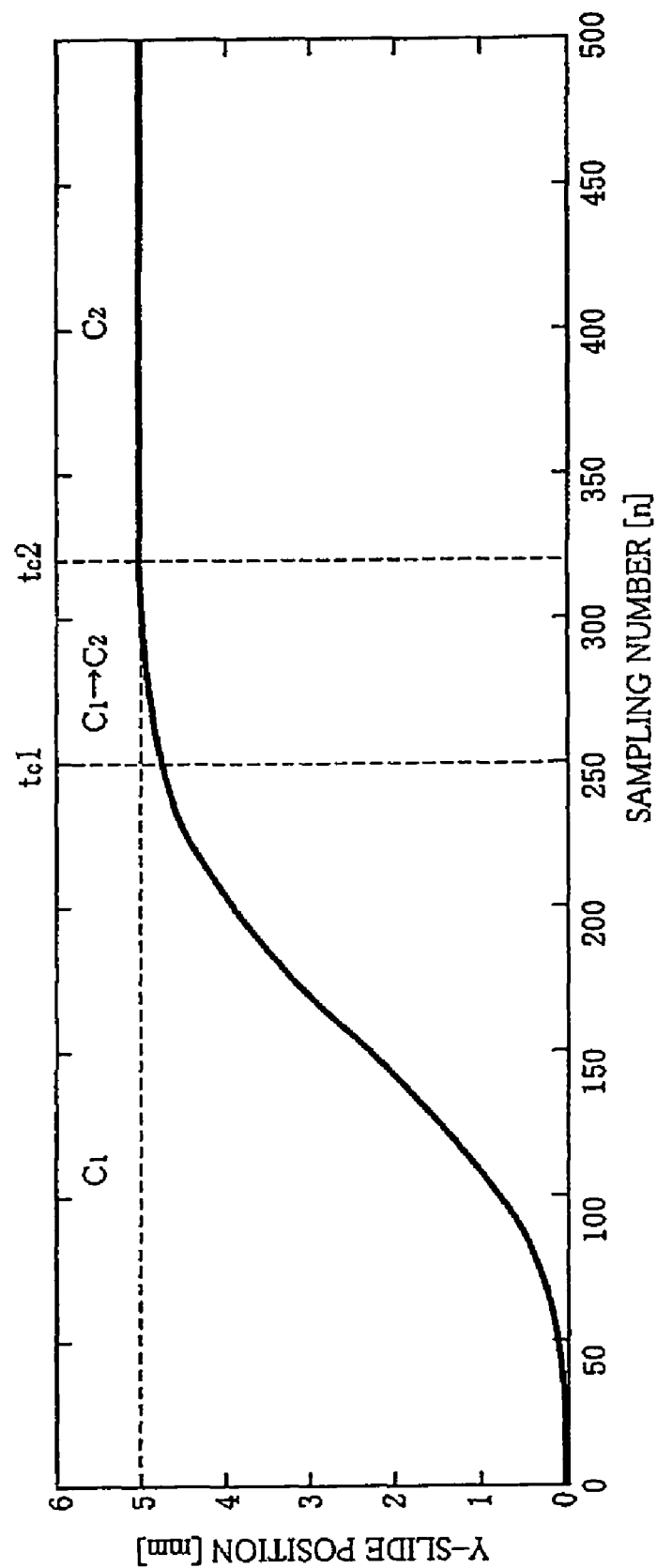
FIG. 22 is a graph for illustrating a timing for switching from the time-variant feedback compensator for motor position compensation to the time-variant feedback compensator for mainbody acceleration compensation.
Figure 23A:
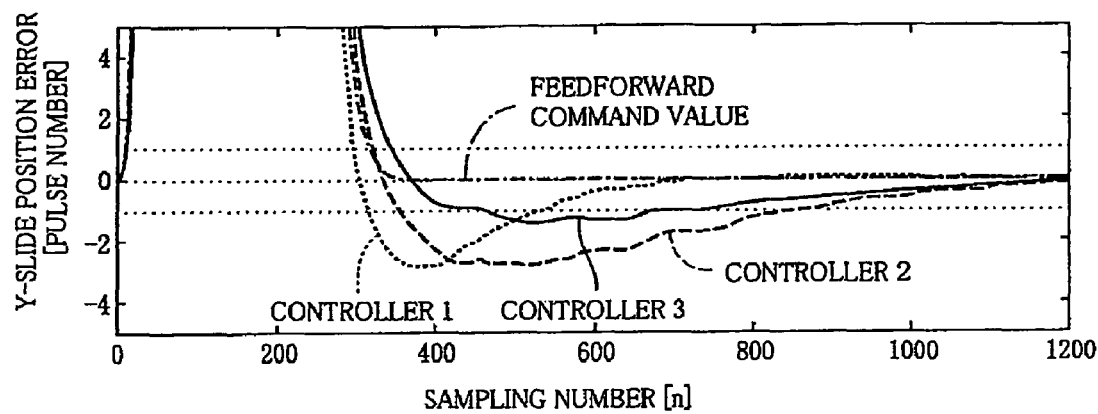
FIGS. 23A and 23B are graphs showing results of a numerical simulation conducted with respect to the control software shown in FIG. 6, and correspond to FIGS. 11A and 11B.
Figure 23B:
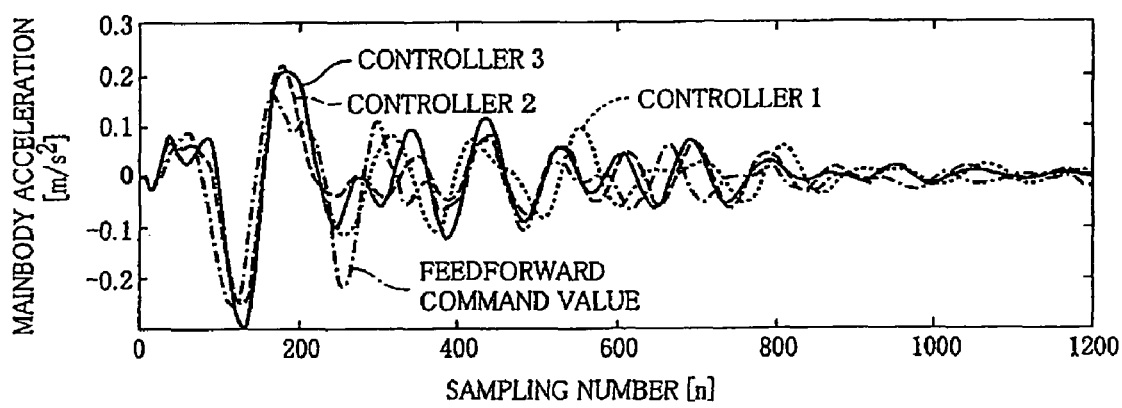
Figure 24A:
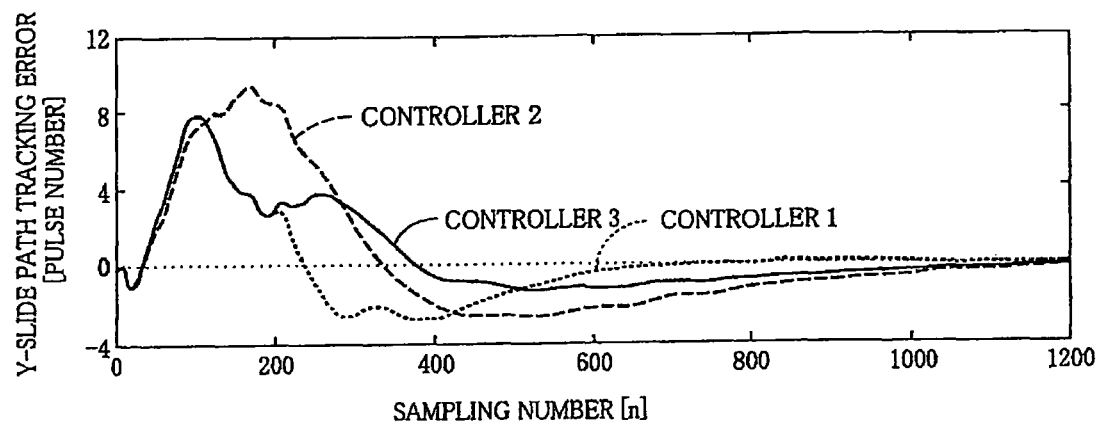
FIGS. 24A and 24B are graphs showing results of the numerical simulation and correspond to FIGS. 12A and 12B.
Figure 24B:
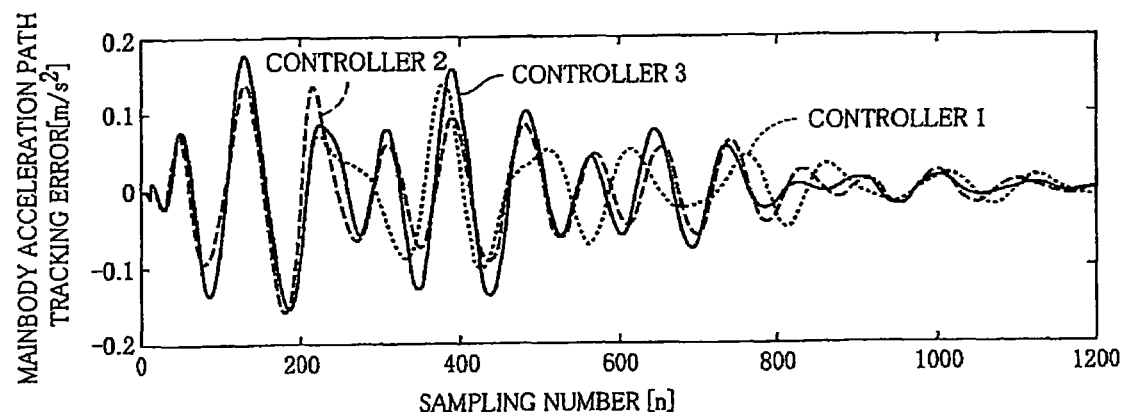
Figure 25A:
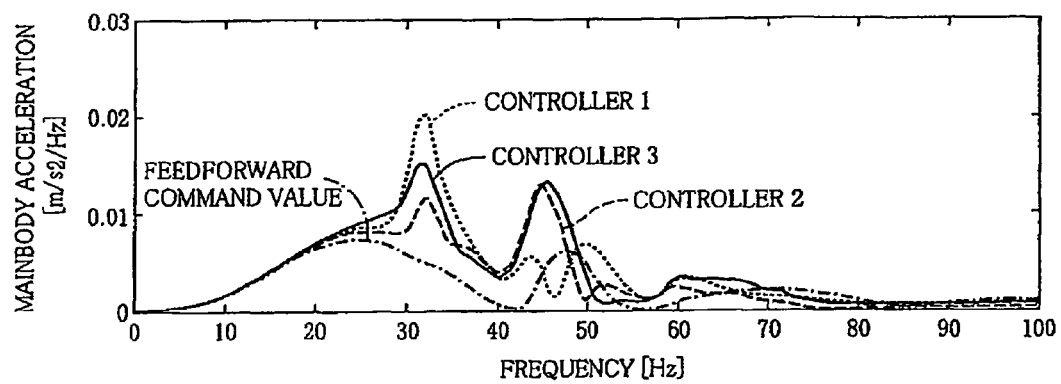
FIGS. 25A and 25B are graphs showing results of the numerical simulation and correspond to FIGS. 13A and 13B.
Figure 25B:
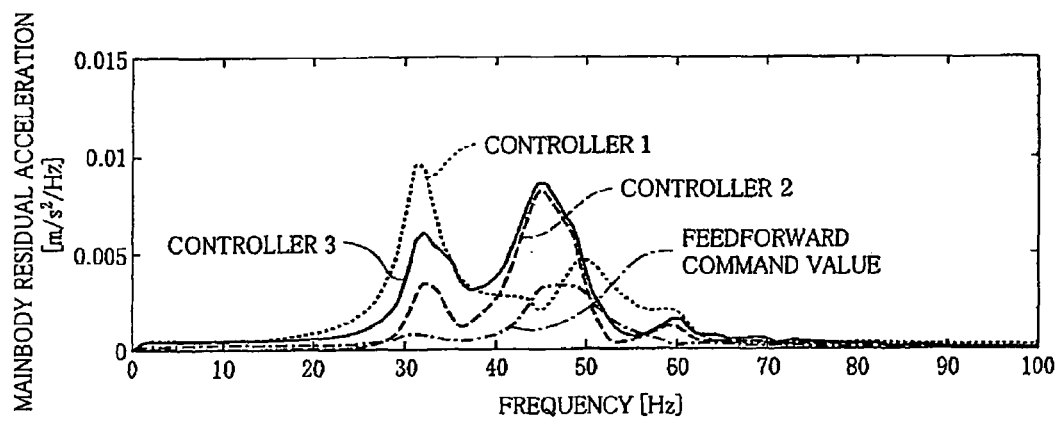
Figure 26A:
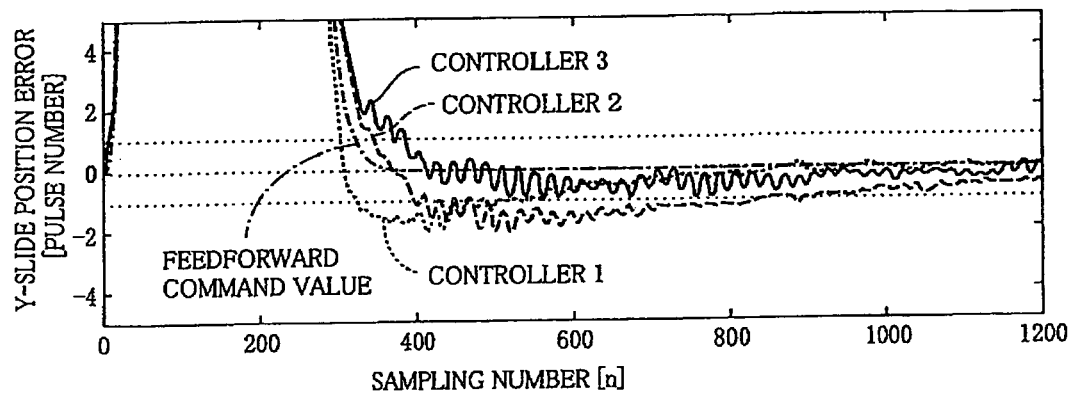
FIGS. 26A and 26B are graphs showing results of an experiment to control the Y-axis slide unit using the control software of FIG. 6, and correspond to FIGS. 11A and 11B.
Figure 26B:
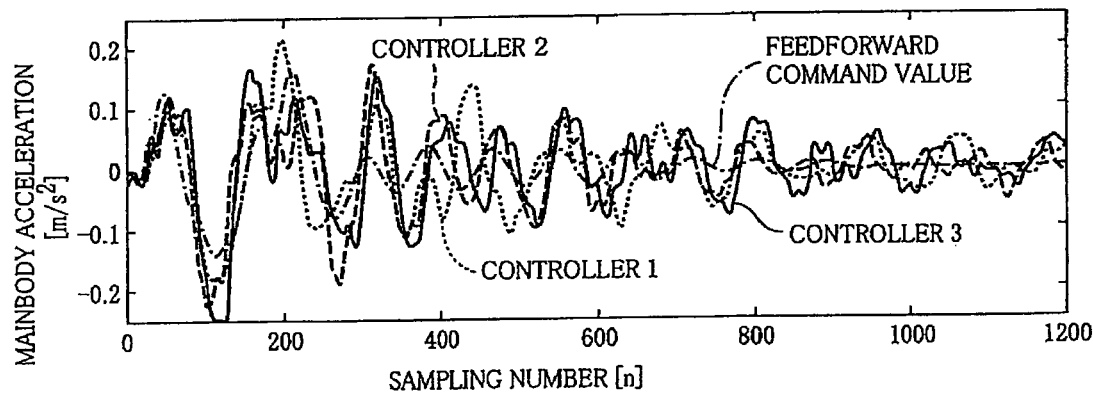
Figure 27A:
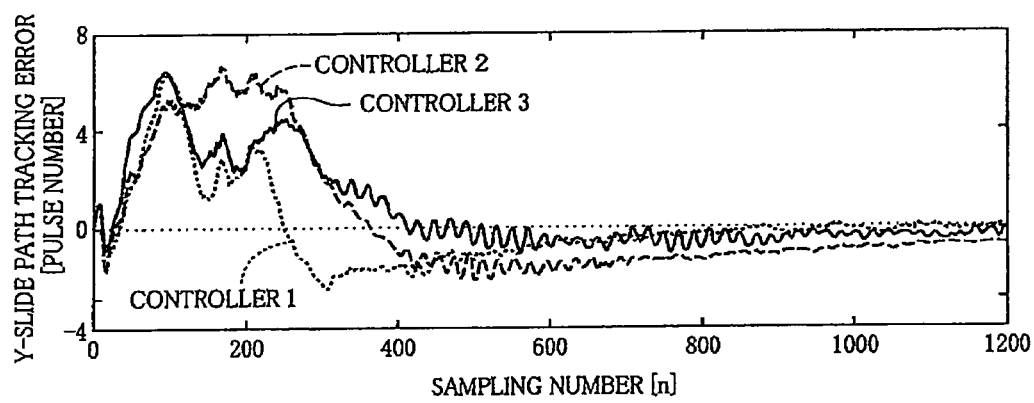
FIGS. 27A and 27B are graphs showing results of the experiment to control the Y-axis slide unit using the control software of FIG. 6, and correspond to FIGS. 12A and 12B.
Figure 27B:
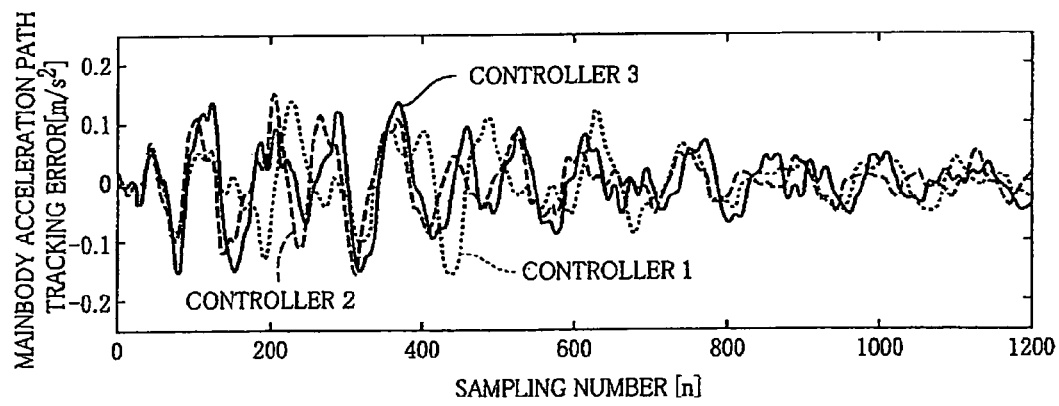
Figure 28A:
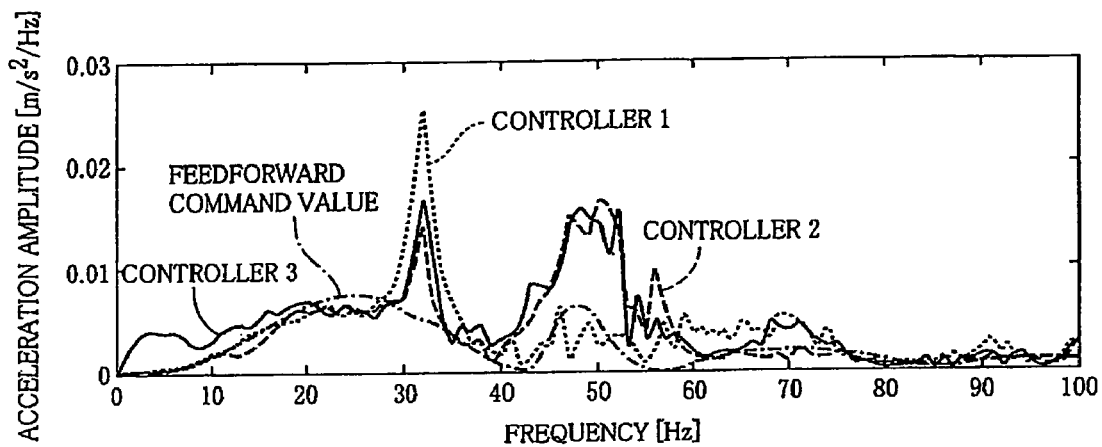
FIGS. 28A and 28B are experiment to control the Y-axis slide unit using the control software of FIG. 6, and correspond to FIGS. 13A and 13B.
Figure 28B:
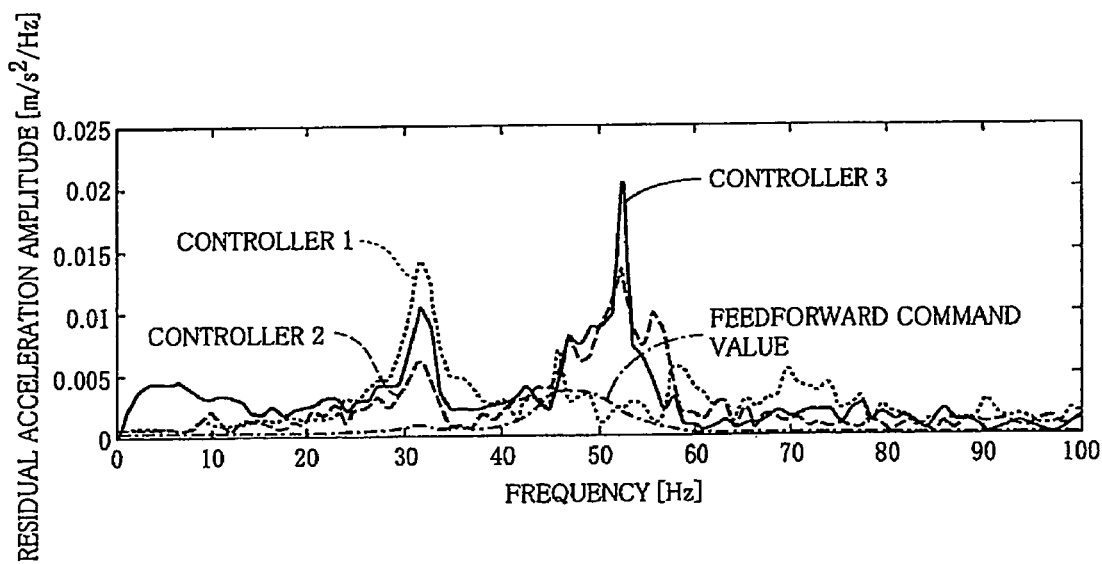

There will be now described designing of the time-varying control system. In accordance with the procedure described above in paragraphs [0085]-[0090], the time-invariant control systems are developed into the time-varying control system. In the designing of the time-varying control system, what is allowed the greatest freedom in selection and most greatly affects the overall characteristics or performance of the time-varying control system are the switching timing at which the compensators designed in advance are changed or switched from one to another, and the method used in the interpolation. However, when the freedom allowed in the selecting the switching timing and the method of interpolation is too great, designing of the time-varying control system is made adversely complicated and tends to involve a time-and-labor-consuming try-and-error process in order to achieve the desired performance of the time-varying control system. Hence, according to this embodiment, the switching timing at which the time-varying control system is switched is set as shown in FIG. 22. That is, the controller 1 is used during a time period C1 from the initial time to a time point tc1 around a time point at which the object of positioning is located and settled at the target position, and then the control system is gradually switched or changed with time from the controller 1 to the controller 2 during a time period C1→C2 or from the time point tc1 to a time point tc2, and the controller 2 is used thereafter or during a time period C2, i.e., after the time point tc2. The two parameters tc1, tc2 are adjusted so as to achieve desirable positioning response characteristics. In this embodiment, based on a try-and-error or heuristic process, these time points tc1, tc2 were determined to be 175 Ts and 220 Ts, respectively.

To evaluate the time-varying control system obtained as described above, a simulation was conducted. In the simulation, there were examined three control systems, namely, the controller 1 designed with the positioning response behavior emphasized, the controller 2 designed with the vibration damping capability emphasized, and a controller 3 constituted by the time-varying control system. In all of the three control systems, same feedforward compensators were used.

FIGS. 23A-25B show results of the simulation. In each of FIGS. 23A-25B, a chain line indicates feedforward command value, and a dotted line, a dashed line, and a solid line indicate responses observed with the controller 1, the controller 2, and the controller 3, respectively. Each of the controllers 1 and 2 gave an excellent result with respect to the property or capability emphasized in designing thereof as described in paragraphs [0079]-[0080], but it cannot be said that the controller 1, 2 has a sufficient capability in the other property. In contrast, the controller 3, which corresponds to the time-varying control system and is designed to take in strong points of the respective controllers 1, 2 in a time-variable manner, succeeds in reducing the motor-path following error as compared to the controller 2, as well as succeeds in reducing the residual vibration of 32 Hz corresponding to the first-order vibration mode of the module mainbody 20 as compared to the controller 1 by its oscillation frequency characteristic. Thus, it is confirmed that the controller 3 gave results in accordance with the design policy of the time-varying control system. It is noted that although influence of the second-order vibration mode around 49 Hz is considerably noticeable, this is because the second-order vibration mode is not positively taken into account in designing of the controller 2, and the influence can be reduced by suitably designing the control system.

To see whether the results of the simulation are obtained in an actual operation, too, there was conducted an experiment to operate the Y-slide device 72 of the mounting module 10 under the same conditions as in the simulation. Results of the experiment are shown in FIGS. 26A-28B from which it is seen that almost the same results as the simulation are obtained, meaning that it is confirmed that the two control objectives corresponding to the two properties are excellently achieved by employment of the time-varying control system. It is noted that although in FIG. 26A occurrence of a vibration is seen in the motor position characteristics with the controllers 2, 3, it can be considered that this results from a residual vibration occurring at the frequency of the third-order vibration mode due to a vibration caused under influence of noise at the servo accelerometer.

In the two embodiments described above, the rotary encoder 206 disposed on the Y-axis motor 82 as a drive source of a drive unit of a movable member is used as a positional-information acquiring device for obtaining information related to the movable member. Since the Y-axis motor 82 and the Y-slide 76 mainly constituting the movable member are coupled with a ball screw constituted by the Y-screw rod 78 and the Y-nut 80, there is a relationship between the rotational position of the Y-axis motor 82 and the position of the Y-slide 76 in the direction of its linear movement. Hence, the rotational position of the Y-axis motor 82 can be utilized as information related to the position of the Y-slide 76. However, acquisition of information related to the position of the movable member is not limited thereto. For instance, a linear scale may be disposed between the Y-slide 76 and the module mainbody 20 (especially the upper frame 66) so as to thereby directly detect the position of the Y-slide 76. That is, as long as the position of the movable member and a piece of information are in one-to-one correspondence, the piece of information can be used as the information related to the position of the movable member.

In each of the above-described two embodiments, the switching area where the feedback compensators 208, 218 as first and second feedback compensators, respectively, are switched or changed to other compensators, is invariant. However, the switching area may be made variable depending on at least one of the travel distance, maximum movement speed, and moving direction of the movable member, and a total mass of members to be moved. Making the switching area variable depending on the moving direction of the movable member is particularly effective or significant when the moving direction of the movable member in the X-Y plane is irregular or non-uniform, and when the rigidity of the module mainbody 20 is non-uniform or uneven in the X- and Y-axis directions in the X-Y plane. For instance, the embodiment may be modified such that a plurality of acceleration and deceleration patterns are predetermined depending on combinations of a travel distance of the mounting head 46 from the current position to a target position and a travel or moving direction of the mounting head 46. In operation, a timing for initiating switching of the feedback compensators that corresponds to one of the patterns corresponding to a movement in question of the mounting head 46, is selected. More specifically, it may be arranged such that a plurality of ranges are predetermined for each of travel distance and moving direction, for instance, and a table associating a plurality of acceleration and deceleration patterns with respectively corresponding combinations of the ranges of travel distance and moving direction is prepared. In operation, one of the acceleration and deceleration patterns is selected and a timing for initiating switching of the feedback compensators that is associated with the selected pattern is read out. More simply, it may be arranged such that a plurality of ranges are predetermined only for travel distance of the mounting head 46 from the current position to a target position, and a table associating the ranges with respectively corresponding timings for initiating switching is prepared. In operation, the timing to initiate switching of the feedback compensators is determined referring to the table.

What is claimed is:
1. An operating apparatus comprising:
a main body;
a movable member which is movable relative to the main body;
a drive unit which includes a drive source and moves the movable member relative to the main body; and
a control unit which controls the drive source so as to control the position of the movable member relative to the main body, the control unit including:
a position control system including (a) a position command portion which outputs a first position command designating the position of the movable member, (b) a first feedforward compensator which receives the position command from the position command portion and outputs a first operation command to the drive source, (c) a second feedforward compensator which receives the position command from the position command portion and outputs a second position command, (d) a positional-information acquiring device which obtains information related to the position of the movable member, and (e) a first feedback compensator which receives as an input a difference between the second position command outputted from the second feedforward compensator and an output of the positional-information acquiring device, and outputs a second operation command to the drive source; and an acceleration control system including (f) an acceleration-information acquiring device which obtains information related to an acceleration of the main body, (g) a third feedforward compensator which receives as an input the first position command from the position command portion and outputs an acceleration command, and (h) a second feedback compensator which receives as an input a difference between the first position command outputted from the third feedforward compensator and an output of the acceleration-information acquiring device, and outputs a third operation command to the drive source.

2. The operating apparatus according to claim 1, wherein both of the first feedback compensator and the second feedback compensator are variable compensators.

3. The operating apparatus according to claim 2, wherein the first feedback compensator and the second feedback compensator are variable compensators such that basically a first degree at which the second operation command from the first feedback compensator affects the first operation command from the first feedforward compensator is higher than a second degree at which the third operation command from the second feedback compensator affects the first operation command, but the second degree is higher than the first degree when the movable member reaches a vicinity of a target position corresponding to the first position command outputted from the position command portion.

4. The operating apparatus according to claim 3, wherein a switching from the first feedback compensator to the second feedback compensator is made smoothly at a switching area where the movable member is in the vicinity of the target position.

5. The operating apparatus according to claim 1, wherein the third feedforward compensator is expressed as a multiplication of a transfer characteristic of the first feedforward compensator from the position command to the first operation command by a transfer characteristic from the first operation command to an output of an acceleration detector.

6. The operating apparatus according to claim 1, wherein the movable member is a linear movable member which linearly moves by being guided by a linear guide disposed on the main body.

7. The operating apparatus according to claim 1, further comprising:

a substrate holding device attached to the main body and holding a circuit substrate; and a component mounting head attached to the movable member and holding an electronic-circuit-component, the component mounting head being moved with the movement of the movable member, in a direction parallel to a surface of the circuit substrate held by the substrate holding device, and attaching the electronic-circuit-component on the circuit substrate.

8. The operating apparatus according to claim 7, wherein the main body includes a lower frame, a plurality of columns standing from the lower frame, and an upper frame supported by the columns, a first movable member is held by the upper frame such that the first movable member is movable in a first horizontal direction, a second movable member is held by the first movable member such that the second movable member is movable in a second horizontal direction perpendicular to the first horizontal direction, and the component mounting head is attached to the second movable member.

9. The operating apparatus according to claim 1, wherein a plurality of the main bodies are supported by a common base, and the operating apparatus is disposed on the common base.

10. The operating apparatus according to claim 1, wherein the acceleration-information acquiring device includes at least one acceleration sensor which is disposed at a position capable of detecting an acceleration of the main body in at least one of two directions perpendicular to each other in a horizontal plane.

11. The operating apparatus according to claim 1, wherein the acceleration-information acquiring device includes at least two acceleration sensors, and obtains a difference between outputs of two of the at least two acceleration sensors as the information related to an acceleration of the main body.

* * * * *